US008713011B2

(12) United States Patent  (10) Patent No.: US 8,713,011 B2
Asai et al.  (45) Date of Patent: Apr. 29, 2014

(54) NAVIGATION APPARATUS, SEARCH RESULT DISPLAY METHOD, AND GRAPHICAL USER INTERFACE

(75) Inventors: Atsushi Asai, Kanagawa (JP); Shinsuke Koyama, Chiba (JP)

(73) Assignee: Sony Corporation (JP)

( * ) Notice: Subject to any disclaimer, the term of this patent is extended or adjusted under 35 U.S.C. 154(b) by 416 days.

(21) Appl. No.: 12/383,031

(22) Filed: Mar. 19, 2009

(65) Prior Publication Data
US 2009/0241061 A1 Sep. 24, 2009

(30) Foreign Application Priority Data

Mar. 21, 2008 (JP) ............... P2008-074264

(51) Int. Cl.
*G06F 3/048* (2013.01)
*G06F 17/30* (2006.01)

(52) U.S. Cl.
USPC ........................................ 707/736; 715/850

(58) Field of Classification Search
CPC ............... G06F 17/30873; G06F 17/30241; G06F 17/30554; G06F 3/04815; G06F 3/0346; G06F 3/0483; G06F 3/0485; G06F 3/04883; G01C 21/3611; G01C 21/3679
USPC ......... 707/736; 715/757, 818, 851, 782, 808, 715/841, 850, 854
See application file for complete search history.

(56) References Cited

U.S. PATENT DOCUMENTS

| | | | |
|---|---|---|---|
| 6,587,782 B1 * | 7/2003 | Nocek et al. ........... | 701/200 |
| 7,266,768 B2 | 9/2007 | Ferlitsch et al. | |
| 7,735,018 B2 * | 6/2010 | Bakhash .............. | 715/782 |
| 2004/0056837 A1 * | 3/2004 | Koga et al. ............... | 345/156 |
| 2004/0100479 A1 * | 5/2004 | Nakano et al. ............ | 345/700 |
| 2005/0210410 A1 * | 9/2005 | Ohwa et al. ............. | 715/821 |
| 2006/0212828 A1 | 9/2006 | Yahiro et al. | |
| 2007/0226652 A1 * | 9/2007 | Kikuchi et al. ........... | 715/836 |
| 2009/0150775 A1 * | 6/2009 | Miyazaki et al. ......... | 715/702 |
| 2010/0058213 A1 * | 3/2010 | Higuchi et al. ........... | 715/766 |

FOREIGN PATENT DOCUMENTS

| | | | |
|---|---|---|---|
| JP | 05210700 A | 8/1993 | |
| JP | 06180661 A | 6/1994 | |
| JP | 08249350 A | 9/1996 | |
| JP | 09-037170 A | 2/1997 | |
| JP | 09259130 A | 10/1997 | |

(Continued)

OTHER PUBLICATIONS

Office Action from Japanese Application No. 2008-074264, dated Jun. 19, 2012.

*Primary Examiner* — Jorge A Casanova
(74) *Attorney, Agent, or Firm* — Lerner, David, Littenberg, Krumholz & Mentlik, LLP

(57) ABSTRACT

A navigation apparatus includes: a basic frame generating unit for generating a basic frame two-dimensionally configured based on a search item axis and a search result display axis; a three-dimensional (3-D) search result listing image generating unit for generating a 3-D search result listing image in which a plurality of search result cards show as if they are stereoscopically arranged in a domino-like configuration along the search item axis and the search result display axis of the basic frame, the search result cards having titles of search results thereon; and a control unit for outputting the 3-D search result listing image to a predetermined display unit with a predetermined display angle, thereby displaying the 3-D search result listing image at the display angle.

12 Claims, 20 Drawing Sheets

(56) References Cited

FOREIGN PATENT DOCUMENTS

| JP | 10307936 A | 11/1998 |
| JP | 2000-132302 A | 5/2000 |
| JP | 2001256146 A | 9/2001 |
| JP | 2004526255 A | 8/2004 |
| JP | 2006-293997 A | 10/2006 |
| JP | 2007257336 A | 10/2007 |

* cited by examiner

| ICON | MAJOR CLASSIFICATION GENRE |
|---|---|
| BJA1  | RESTAURANTS |
| BJA2  | AMUSEMENT FACILITIES |
| BJA3  | SHOPPING MALLS |
| BJA4  | TRANSPORTATIONS |
| BJA5  | ACCOMMODATIONS |
| BJA6  | SCENIC/TOURIST SPOTS |
| BJA7  | PUBLIC FACILITIES |
| BJA8  | HISTORY |
| BJA9  | FAVORITE |

| | ICON | MEDIUM CLASSIFICATION GENRE |
|---|---|---|
| MJA1 |  | FAST FOOD RESTAURANTS |
| MJA2 |  | CONVENIENCE STORES |
| MJA3 |  | DRUGSTORES |
| MJA4 |  | HARDWARE STORES |
| MJA5 |  | SUPERMARKETS |
| MJA6 |  | BOWLING ALLEYS |
| MJA7 |  | GOLF COURSES |
| MJA8 |  | MOVIE THEATERS |
| MJA9 |  | FAMOUS PLACES FOR FLOWERS |
| MJA10 |  | ART MUSEUMS |
| MJA11 |  | SCENIC SPOTS |
| MJA12 |  | HOTELS |
| MJA13 |  | INNS |
| MJA14 |  | PARKING LOTS |
| MJA15 |  | GAS STATIONS |
| MJA16 |  | POST OFFICES |
| MJA17 |  | HOSPITALS |

NAVIGATION APPARATUS, SEARCH RESULT DISPLAY METHOD, AND GRAPHICAL USER INTERFACE

CROSS REFERENCES TO RELATED APPLICATIONS

The present application claims priority from Japanese Patent Application No. JP-2008-074264, filed in the Japanese Patent Office on Mar. 21, 2008, the entire content of which is incorporated herein by reference.

BACKGROUND OF THE INVENTION

1. Field of the Invention

The present invention relates to a navigation apparatus, a search result display method, and a graphical user interface, and is suitably applicable to a vehicle navigation apparatus, for example.

2. Description of the Related Art

Vehicle navigation apparatuses have been heretofore configured to search for location information on a destination and the like desired by a user and display the search results on a monitor. These pieces of location information are typically referred to as points of interest (POIs). Each individual POI is composed of elements such as name, longitude, latitude, address, genre, telephone number, and uniform resource locator (URL).

When searching for POIs, a vehicle navigation apparatus may find and display each individual POI based on a concrete name or the like input by the user, or list all POIs that match with the condition in a range nearest to the current position or an arbitrarily designated location, on a search result screen LG of list form such as shown in FIG. 1.

Some vehicle navigation apparatuses display a menu screen on which menu items are arranged in a predetermined three-dimensional (3-D) virtual solid in a contemplated way of overlapping so that all the menu items can be visually observed at least in part (for example, see patent document 1: Jpn. Pat. Appln. Laid-Open Publication No. 2006-293997).

SUMMARY OF THE INVENTION

Now, in the vehicle navigation apparatus described in the foregoing cited document 1, menu items can be visually observed only in part. It has therefore been impossible for users to instantaneously recognize information that is read on the other parts hidden behind the front menu items. It has also been difficult for users to recognize all search results at the same time, with the problem of poor usability.

The present invention has been achieved, in view of the foregoing, to propose a navigation apparatus, a search result display method, and a graphical user interface which can display search results of high operability, intuitively easily understandable to everyone.

To solve the foregoing problems, a navigation apparatus and a search result display method according to an aspect of the present invention: generate a basic frame two-dimensionally configured based on a search item axis and a search result display axis; generate a 3-D search result listing image in which a plurality of search result cards show as if they are stereoscopically arranged in a domino-like configuration along the search item axis and the search result display axis of the basic frame, the search result cards having titles of search results thereon; and output the 3-D search result listing image to a predetermined display unit with a predetermined display angle, thereby displaying the 3-D search result listing image at the display angle.

Consequently, a 3-D search result listing image having a large amount of information, in which a plurality of search result cards having the titles of search results thereon show as if they are stereoscopically arranged in a domino-like configuration along the search item axis and the search result display axis of the basic frame, can be presented with a predetermined display angle. This makes it possible to provide search results of high operability, intuitively easily understandable to users while allowing the users to visually observe the titles of all the search result cards.

In an aspect of the present invention, a two-dimensionally configured basic frame is generated based on a search item axis and a search result display axis. A 3-D search result listing image is generated in which a plurality of search result cards show as if they are stereoscopically arranged in a domino-like configuration along the search item axis and the search result display axis of the basic frame, the search result cards having titles of search results thereon. This 3-D search result listing image is output to a predetermined display unit with a predetermined display angle, whereby the 3-D search result listing image is displayed.

Consequently, a 3-D search result listing image having a large amount of information, in which a plurality of search result cards having the titles of search results thereon show as if they are stereoscopically arranged in a domino-like configuration along the search item axis and the search result display axis of the basic frame, can be presented with a predetermined display angle. This makes it possible to provide search results of high operability, intuitively easily understandable to users while allowing the users to visually observe the titles of all the search result cards.

According to the present invention, there is presented a 3-D search result listing image having a large amount of information, in which a plurality of search result cards having the titles of search results show as if they are stereoscopically arranged in a domino-like configuration along the search item axis and the search result display axis of the basic frame, whereby search results of high operability, intuitively easily understandable to users can be presented with a predetermined display angle. This makes it possible to provide search results of high operability, intuitively easily understandable to users while allowing the users to visually observe the titles of all the search result cards. Consequently, it is possible to achieve a navigation apparatus, a search result display method, and a graphical user interface which can display search results of high operability, intuitively easily understandable to everyone.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Hereinafter, an embodiment of the present invention will be described in detail with reference to the drawings.

(1) Overall Appearance and Configuration of PND

Figure 2:
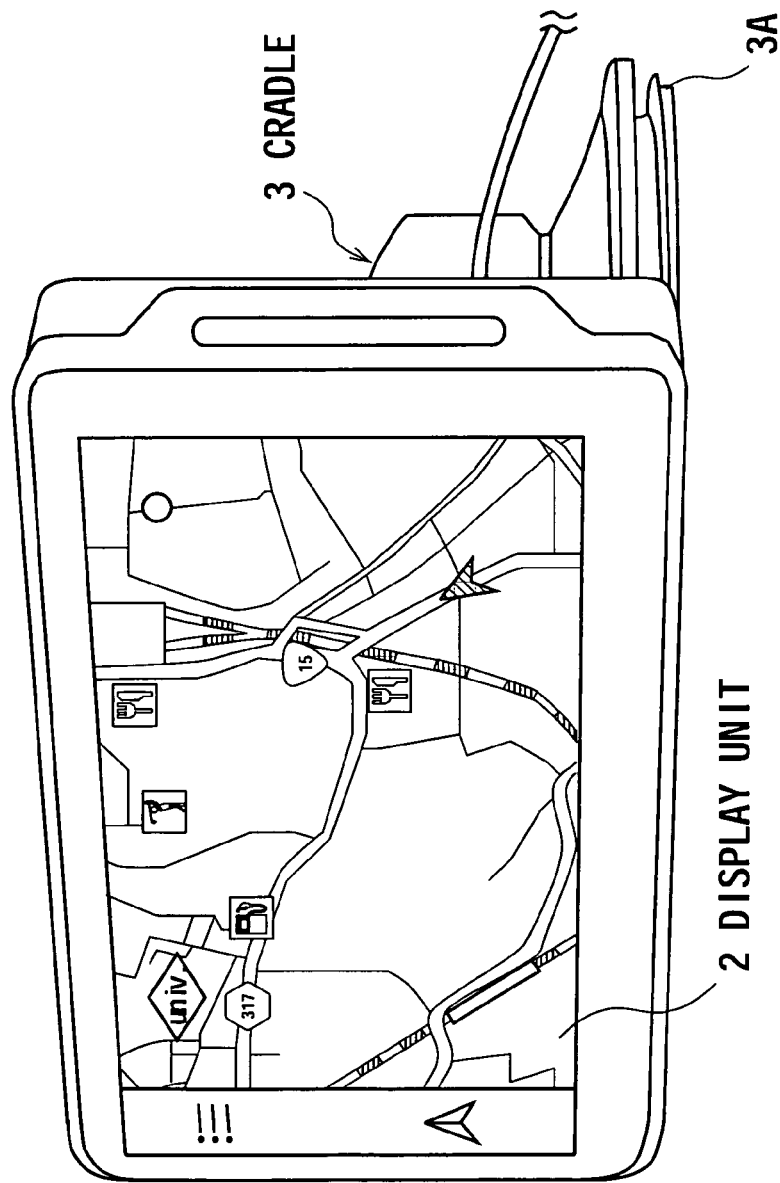
FIG. 2 is a schematic perspective view showing the overall appearance and configuration of a PND according to an embodiment of the present invention.

FIG. 2 shows a portable navigation device (hereinafter, this will be referred to as PND) 1 according to an embodiment of the present invention as a whole. The PND 1 has a display unit 2 on which a 4.8-inch liquid crystal display is mounted. The PND 1 presents a map, a current position icon, a driving route to a destination, etc., on the display unit 2.

The PND 1 is held by a cradle 3 which is attached to a vehicle's dashboard with a suction cup 3A. The PND 1 is electrically connected with the cradle 3.

The PND 1 can thus operate with electric power supplied from the vehicle's battery through the cradle 3. The PND 1 can also operate independently with electric power supplied from its built-in battery when detached from the cradle 3.

(2) Circuit Configuration of PND

Figure 3:
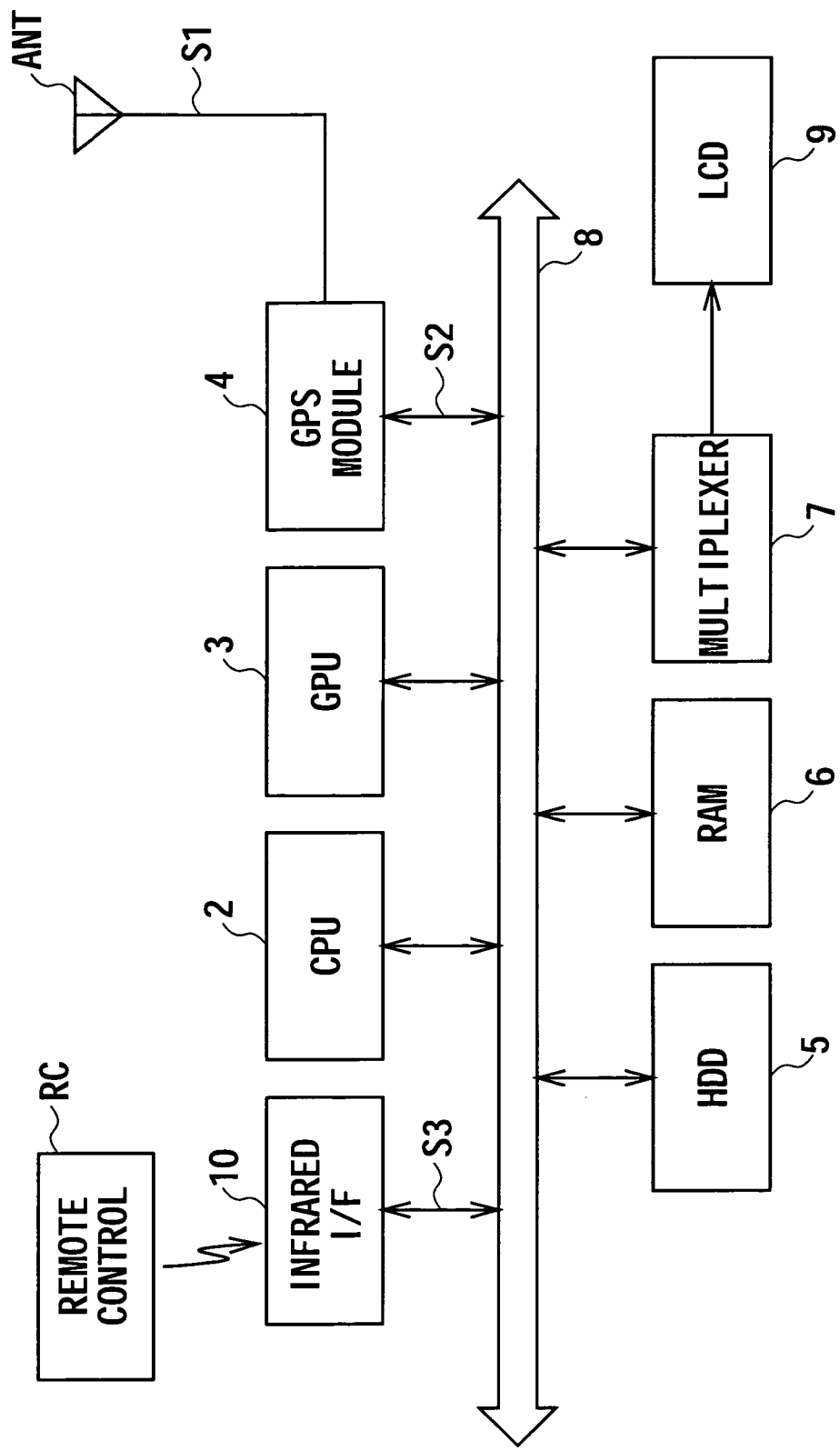
FIG. 3 is a schematic block diagram showing the circuit configuration of the PND.

As shown in FIG. 3, the PND 1 exercises integrated control on its entirety according to a basic program which is read by a central processing unit (CPU) 2 from a hard disk drive 5 and run on a random access memory (RAM) 6.

The PND 1 can also realize various kinds of functions according to various types of application programs which are read by the CPU 2 from the hard disk drive 5 and run on the RAM 6.

In this PND 1, satellite signals S1 from a plurality of GPS satellites are received by a GPS antenna ANT, and sent to a GPS module 4. The GPS module 4 measures the current position of the vehicle accurately based on orbital data obtained by demodulating each of the plurality of satellite signals S1, and data on the distances from the plurality of GPS satellites to the vehicle. The GPS module 4 thereby obtains current position data S2 and sends it to the CPU 2.

Based on the current position data S2, the CPU 2 reads map data on the surroundings including the current position of the vehicle from the hard disk drive 5, and makes a GPU 3 draw a map screen including the current position. The CPU 2 then outputs this map screen to a liquid crystal display (LCD) 9 through a multiplexer 7, whereby the map screen is displayed.

Now, when the PND 1 receives through an infrared interface 10 a destination search instruction S3 which is transmitted in response to a depressing operation on a "Go to" button on a remote control RC, it transfers the destination search instruction S3 to the CPU 2.

Under the destination search instruction S3, the CPU 2 makes search preparation for creating a search result screen (to be described later) on which a plurality of POIs are arranged as destination candidates. The POIs are classified by genres of major classifications (hereinafter, these will be referred to as major classification genres) to be used as search items.

The GPU 3 draws a predetermined search result screen based on the content of the search preparation made by the CPU 2, and sends it to the multiplexer 7.

The multiplexer 7 superimposes the foregoing search result screen on a menu screen for proceeding to navigation operations and the map screen drawn by the GPU 3, thereby creating an output screen. The multiplexer 7 outputs the output screen to the LCD 9.

(3) Structure of Search Result Screen

Next, description will be given in detail of the structure of the search result screen, a 3-D search result listing image which the PND 1 creates and displays on the LCD 9.

Figure 4:
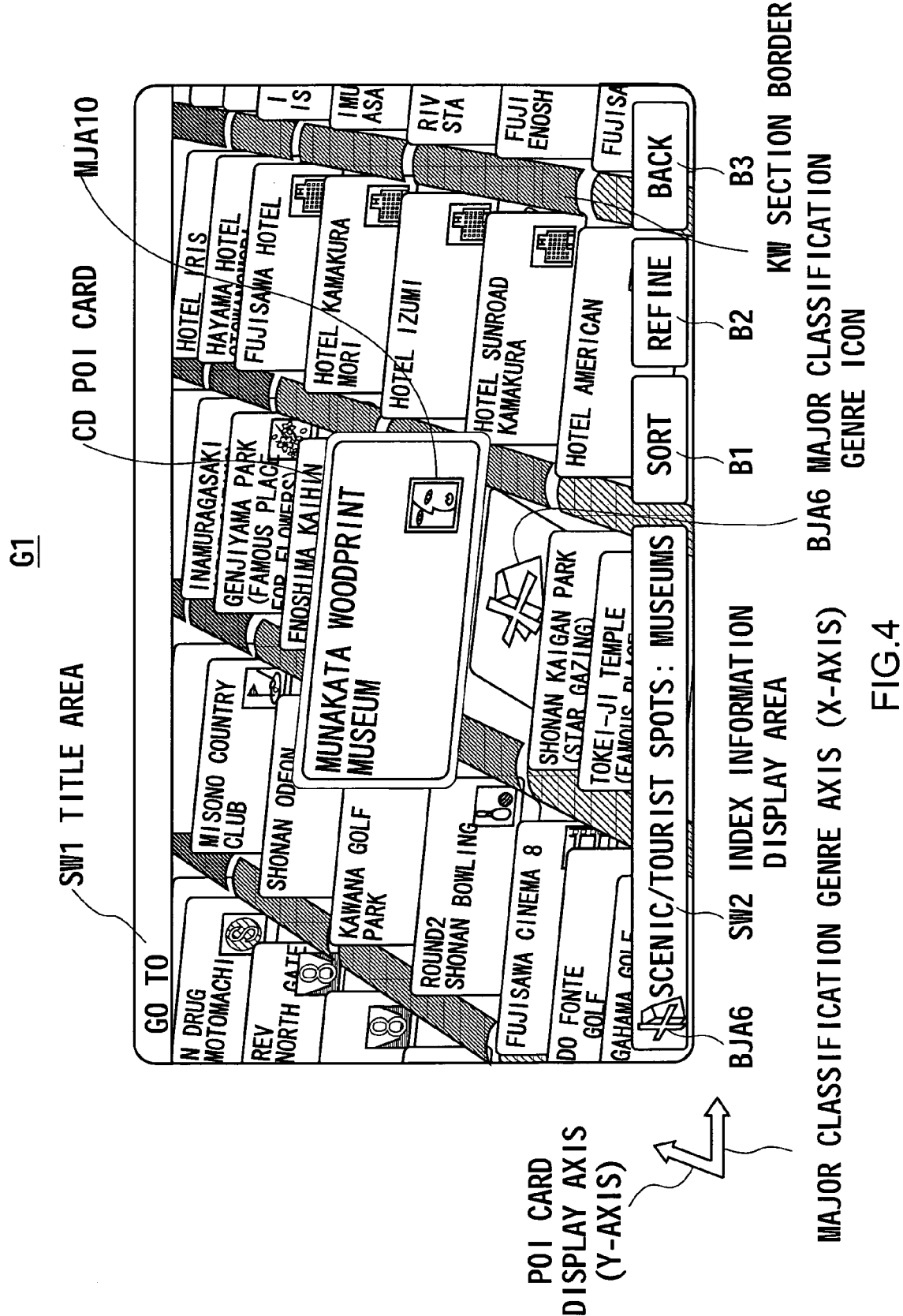
FIG. 4 is a schematic diagram showing configuration (1) of a search result screen according to the embodiment of the present invention.

As shown in FIG. 4, the search result screen G1 displayed on the LCD 9 has a basic frame with a major classification genre axis as the horizontal axis (X-axis) and a POI card display axis as the vertical axis (Y-axis). A plurality of types of major classification genres are arranged on the major classification genre axis (X-axis). A plurality of search results, or POI cards CD, are arranged on the POI card display axis (Y-axis) in order of closeness to the current position of the vehicle.

The search result screen G1 includes a plurality of POI cards CD which have the names of points of interest (POIs) to be searched thereon. The POI cards CD are arranged in units of POIs along the major classification genre axis (X-axis), which is a search item axis, and the POI card display axis (Y-axis), which is a search result display axis, of the basic frame, and are displayed at an angle such that they can be viewed across obliquely from above.

On the search result screen G1, the major classification genres on the major classification genre axis (X-axis) are sectioned by a plurality of section borders KW of predetermined lengths which are arranged along the POI card display axis (Y-axis).

On the search result screen G1, the section borders KW are used as guidelines for arranging the POI cards CD from the near side to the far side in order of closeness to a designated location (for example, the current position of the vehicle). The section borders KW are arranged at every width interval of the POI cards CD.

The major classification genres to be arranged on the major classification genre axis (X-axis) refer to search items which are classified by keywords that serve as guidelines when a user searches for a destination. A plurality of POI cards in each major classification genre are arranged along the POI card display axis (Y-axis).

Figure 5:
FIG. 5 is a schematic diagram showing major classification genre icons.
Figure 5:
Figure 5:
Figure 5:
Figure 5:
Figure 5:
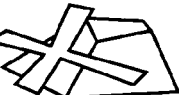
Figure 5:
Figure 5:
Figure 5:

The search result screen G1 displays major classification genre icons, such as BJA6, which represent these major classification genres. For example, as shown in FIG. 5, a major classification genre icon BJA1 represents a major classification genre "restaurants." A major classification genre icon BJA2 represents a major classification genre "amusement facilities."

A major classification genre icon BJA3 represents a major classification genre "shopping malls." A major classification genre icon BJA4 represents a major classification genre "transportations." A major classification genre icon BJA5 represents a major classification genre "accommodations." A major classification genre icon BJA6 represents a major classification genre "scenic/tourist spots."

A major classification genre icon BJA7 represents a major classification genre "public facilities." A major classification genre icon BJA8 represents a major classification genre "history," which shows the past history of destinations having been designated so far. A major classification genre icon BJA9 represents a major classification genre "favorite," which shows destinations set by the user's own preferences.

Here, the search result screen G1 (FIG. 4) is sectioned into the major classification genre "shopping malls," the major classification genre "amusement facilities," the major classification genre "scenic/tourist spots," the major classification genre "accommodations," and the major classification genre "transportations" from the left of the major classification genre axis (X-axis).

In fact, the search result screen G1 displays the major classification genre icon BJA6, which represents the major classification genre "scenic/tourist spots," near the center so as to be visually observable. In the meantime, the major classification genre icon BJA3 which represents the major classification genre "shopping malls," the major classification genre icon BJA2 which represents the major classification genre "amusement facilities," the major classification genre icon BJA5 which represents the major classification genre "accommodations," and the major classification genre icon BJA4 which represents the major classification genre "transportations" are located under the POI cards CD and cannot be visually observed in this state.

The POI cards CD are all formed in a rectangular shape and in an identical size, and are arranged at predetermined intervals from each other in the direction of the POI card display axis (Y-axis), i.e., in a domino-like configuration.

On the search result screen G1, POI cards CD of places closer to a designated point (for example, the current position of the vehicle) are arranged on the near side. POI cards CD of places farther from the designated location (the current position of the vehicle) are arranged on the far side.

Note that the search result screen G1 is rendered with perspective techniques, so that the POI cards CD are arranged at gradually-decreasing card intervals from the near side to the far side.

That is, since the POI cards CD are arranged at gradually-decreasing card intervals from the near side to the far side of the search result screen G1, the section borders KW are also displayed to decrease in size from the near side to the far side.

Each POI card CD has its POI title (for example, "Munakata Woodprint Museum") on the upper area. This makes it possible for the user to visually observe the POI titles of all POI cards CD on the search result screen G1 when the POI cards CD are displayed at an angle such that they can be viewed across obliquely from above.

Incidentally, the search result screen G1 shows the POI cards CD in semi-transparent white. Even when POI cards CD lying in front make POI cards CD behind less visible, the user can thus visually observe the POI titles of the POI cards CD behind all the time through the semi-transparent POI cards CD in front.

Figure 6:
FIG. 6 is a schematic diagram showing middle classification genre icons.
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:

As shown in FIG. 6, each POI card CD has a middle classification genre icon, such as MJA1 to MJA17, that represents the middle classification genre of the POI on the lower right area of the surface, whereby the middle classification genre of that POI can be roughly presented. Middle classification genres refer to search items hierarchically below the major classification genres.

A middle classification genre icon MJA1 represents a middle classification genre "fast food restaurants." A middle classification genre icon MJA2 represents a middle classification genre "convenience stores." A middle classification genre icon MJA3 represents a middle classification genre "drugstores."

A middle classification genre icon MJA4 represents a middle classification genre "hardware stores." A middle classification genre icon MJA5 represents a middle classification genre "supermarkets." A middle classification genre icon MJA6 represents a middle classification genre "bowling alleys."

A middle classification genre icon MJA7 represents a middle classification genre "golf courses." A middle classification genre icon MJA8 represents a middle classification genre "movie theaters." A middle classification genre icon MJA9 represents a middle classification genre "famous places for flowers." A middle classification genre icon MJA10 represents a middle classification genre "art museums."

A middle classification genre icon MJA11 represents a middle classification genre "scenic spots." A middle classification genre icon MJA12 represents a middle classification genre "hotels." A middle classification genre icon MJA13 represents a middle classification genre "inns."

A middle classification genre icon MJA14 represents a middle classification genre "parking lots." A middle classification genre icon MJA15 represents a middle classification genre "gas stations." A middle classification genre icon MJA16 represents a middle classification genre "post offices." A middle classification genre icon MJA17 represents a middle classification genre "hospitals."

It should be appreciated that the middle classification genre icons MJA are not limited to these types. Various other types of middle classification genre icons MJA may be included, but will be omitted here for the convenience of description.

On the search result screen G1 (FIG. 4), the POI cards CD having these middle classification genre icons MJA1 to MJA17 are arranged in a domino-like configuration so that the user can easily grasp the contents of the POIs from the POI titles and the middle classification genre icons MJA.

Figure 7:
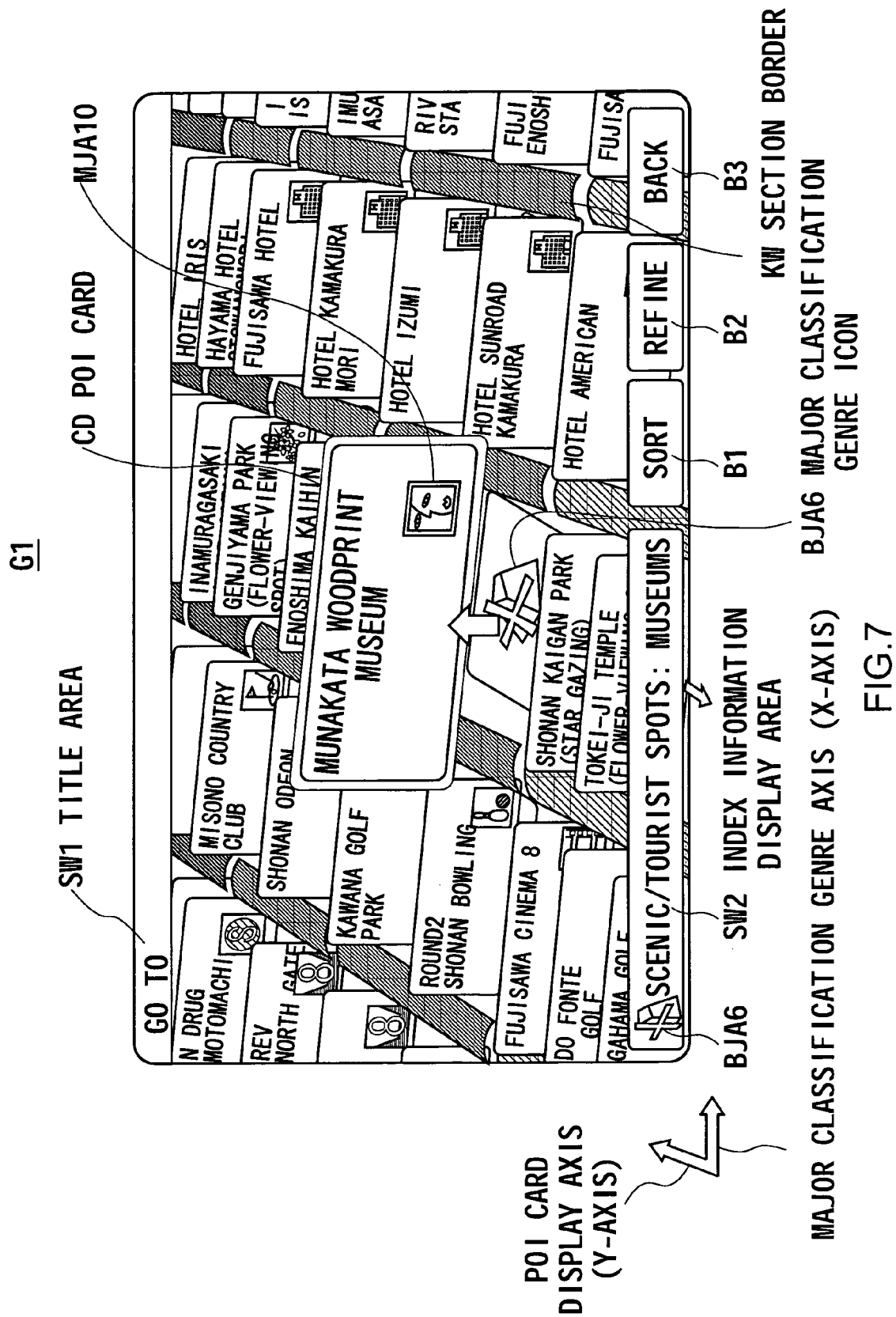
FIG. 7 is a schematic diagram showing configuration (2) of the search result screen according to the embodiment of the present invention.
Figure 8:
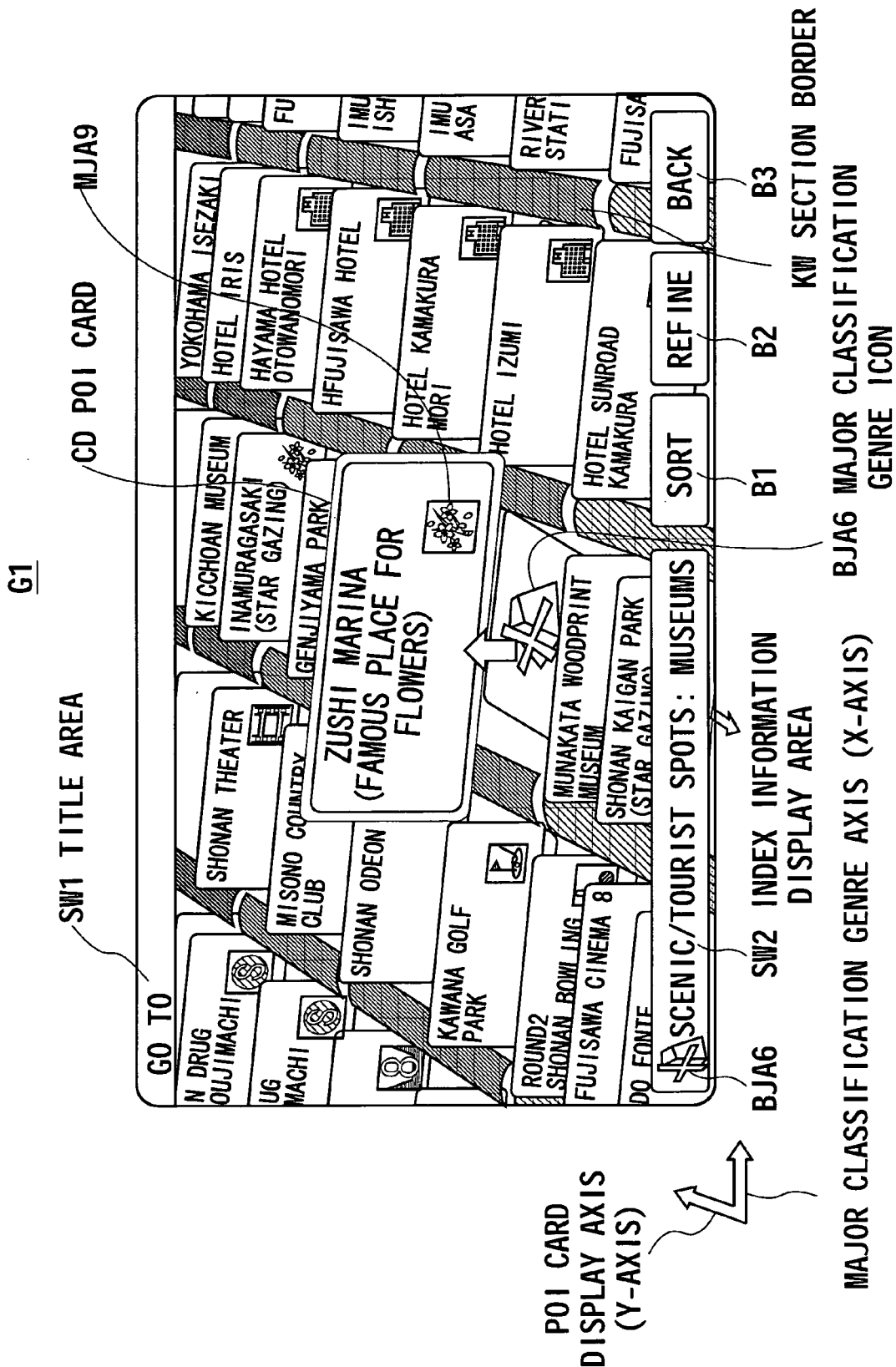
FIG. 8 is a schematic diagram showing configuration (3) of the search result screen according to the embodiment of the present invention.
Figure 9:
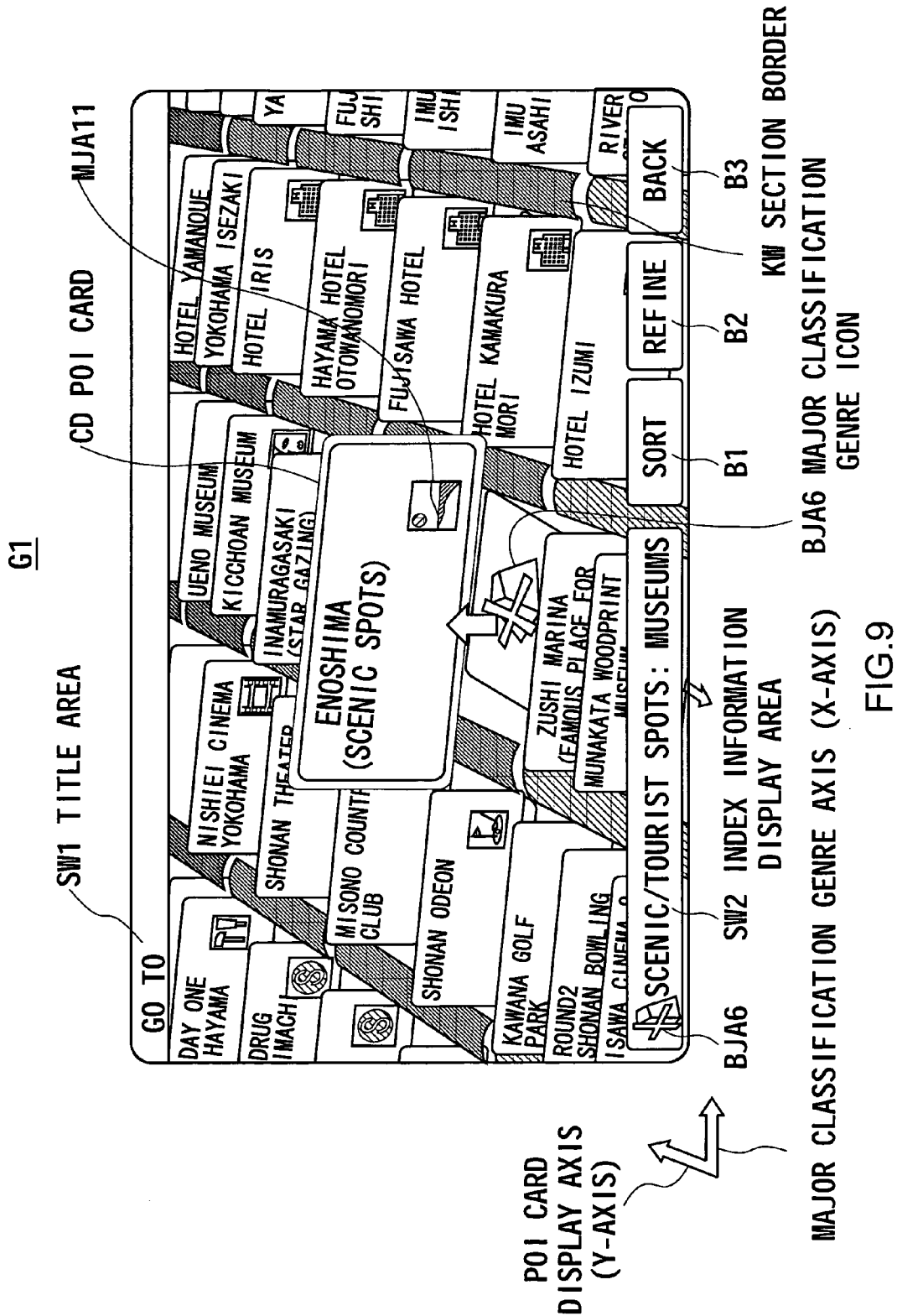
FIG. 9 is a schematic diagram showing configuration (4) of the search result screen according to the embodiment of the present invention.

On the search result screen G1, a POI card CD that falls on a focus position located near the center is considered as being selected. On the search result screen G1, as shown in FIG. 7, the POI card CD in focus (for example, "Munakata Woodprint Museum") is then displayed as if it is moved to a display position vertically above the initial position by a predetermined distance and is magnified by a predetermined magnification. This can facilitate the user recognizing that the POI card CD is currently in a focused and selected state.

Here, on the search result screen G1, the section borders KW corresponding to the POI card CD currently in focus are made longer than the section borders KW corresponding to the POI cards CD on the far side and the section borders KW corresponding to the POI cards CD on the near side. The POI cards CD in front and behind are arranged at intervals corresponding to the lengths of those section borders KW.

Consequently, the search result screen G1 can improve the visibility of the POI card CD currently in focus, and increase the degrees of overlapping between a plurality of POI cards CD lying on the near side and far side of this POI card CD, thereby increasing the amount of information of the POI cards CD that can be displayed on a single screen.

On the search result screen G1, the brightness level of the POI card CD currently in focus is adjusted to increase and decrease for the sake of highlighting. Since this POI card CD alone is made brighter or dimmer, it is possible to facilitate the user immediately recognizing which of the POI cards CD is currently selected.

As above, the CPU 2 of the PND 1 provides animated display, by using the GPU 3, such that the POI card CD in focus pops up above the other POI cards CD for enlarged display and that the POI card CD is adjusted in brightness level for highlighting. Through the action of the POI card CD, the CPU 2 of the PND 1 can thus facilitate the user immediately and readily recognizing that this POI card CD is selected.

In particular, since the POI card CD currently in focus is moved to a display position higher than the others on the search result screen G1, the major classification genre icon BJA6 corresponding to the POI card CD is not hidden under the POI card CD but can be visually observed by the user easily.

It should be appreciated that the search result screen G1 may display not only a plurality of POI cards CD but also a detailed information screen (not shown) in a position different from where the POI card CD is displayed. The detailed information screen may include the "POI title" of the POI corresponding to the POI card CD currently in focus, "content" pertaining to that POI, etc.

In fact, as shown in FIGS. 4, 7, 8, and 9, the CPU 2 of the PND 1 shifts the entire search result screen G1 to the near side by using the GPU 3, in response to a user's depressing operation on an up arrow button on the remote control RC.

In doing so, on the search result screen G1, the POI card CD to fall on the focus position is switched in succession, like "Munakata Woodprint Museum"→"Zushi Marina"→"Enoshima (scenic spot)." These POI cards are each time moved to the display position vertically above for enlarged display.

Here, the CPU 2 of the PND 1 changes and displays the content of the detailed information screen each time the POI card CD currently in focus on the search result screen G1 is switched to an unselected POI card CD.

It should be appreciated that the search result screen G1 (FIGS. 4, 7, 8, and 9) displays a title area SW1 on the upper left of the screen. Text "Go to," which indicates that the search result corresponds to the depressing operation on the "Go to" button of the remote control RC, appears in the title area SW1.

The search result screen G1 also displays an index information display area SW2 on the lower left of the screen. The major classification genre icon BJA6 of the POI card CD currently in focus, text "scenic/tourist spots" which the major classification genre icon BJA6 represents, and text "museums" which the middle classification genre icon MJA10 represents appear in the index information display area SW2.

Consequently, on the search result screen G1 (FIGS. 4 and 7), the major classification genre and the middle classification genre of the POI card CD currently in focus can be presented not only by means of the major classification genre icon BJA6 seen under the POI card CD and the middle classification genre icon MJA10, but also the characters in the index information display area SW2.

The search result screen G1 (FIG. 4 and FIGS. 7 to 9) also has a sort button B1, a refine button B2, and a back button B3 on the right of the index information display area SW2.

When the sort button B1 is depressed with some condition given, the CPU 2 of the PND 1 then sorts the POI cards CD again according to the condition. When the refine button B2 is depressed with some condition given, the CPU 2 of the PND 1 narrows down and displays POI cards CD again. When the back button B3 is depressed, the CPU 2 of the PND 1 restores the screen to the previous state.

Figure 10:
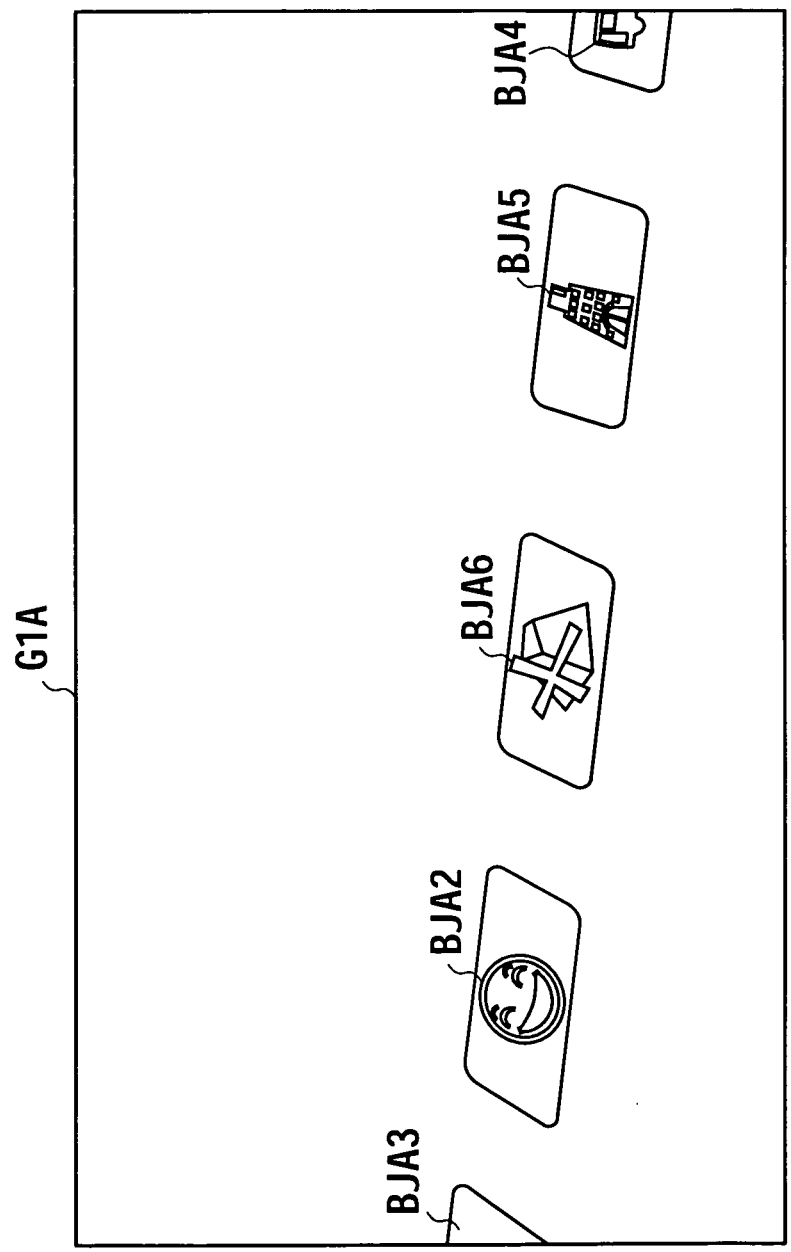
FIG. 10 is a schematic diagram showing a major classification genre icon image in which major classification genre icons are arranged.
Figure 11:
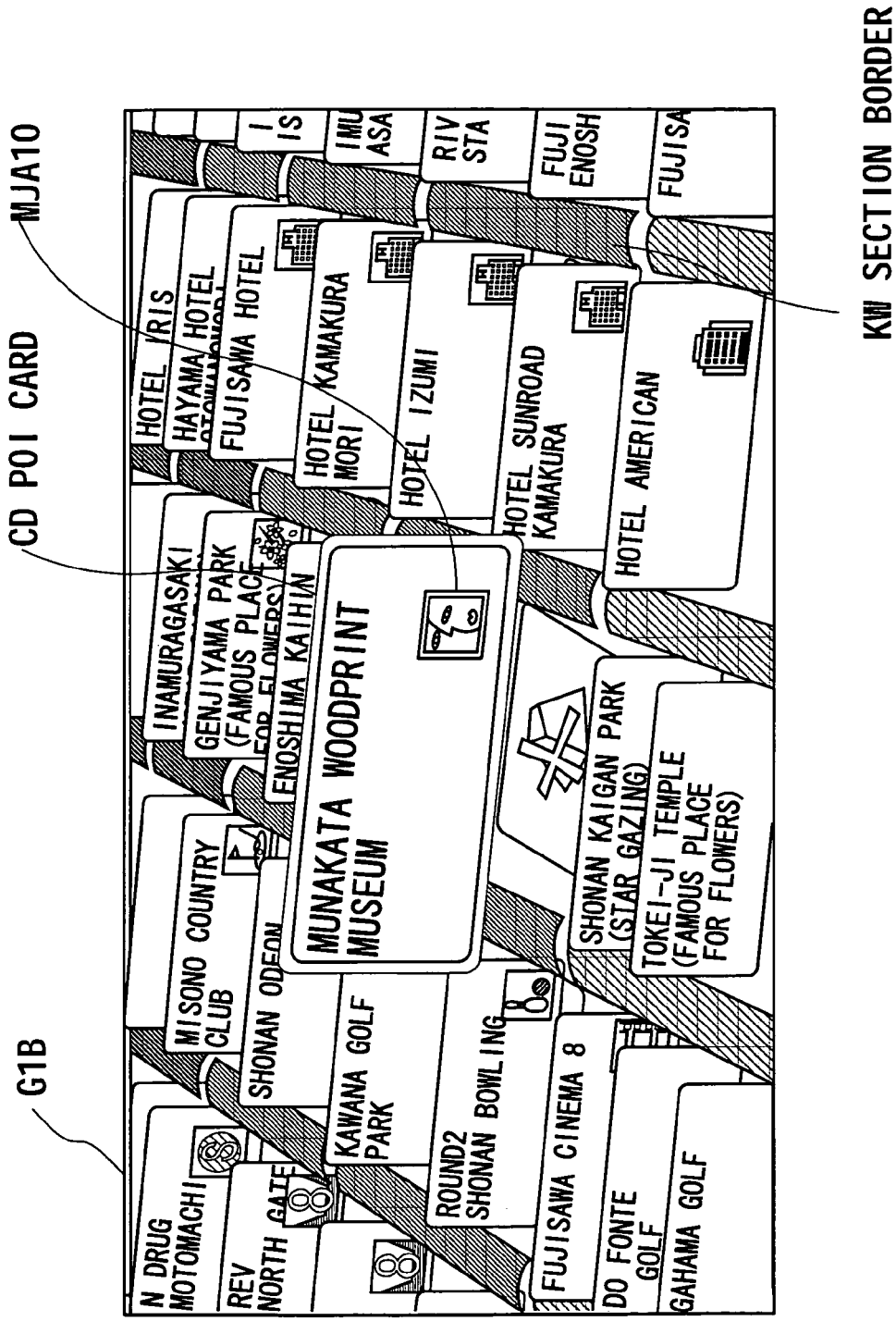
FIG. 11 is a schematic diagram showing a 3-D POI card display image in which POI cards are arranged.
Figure 12:
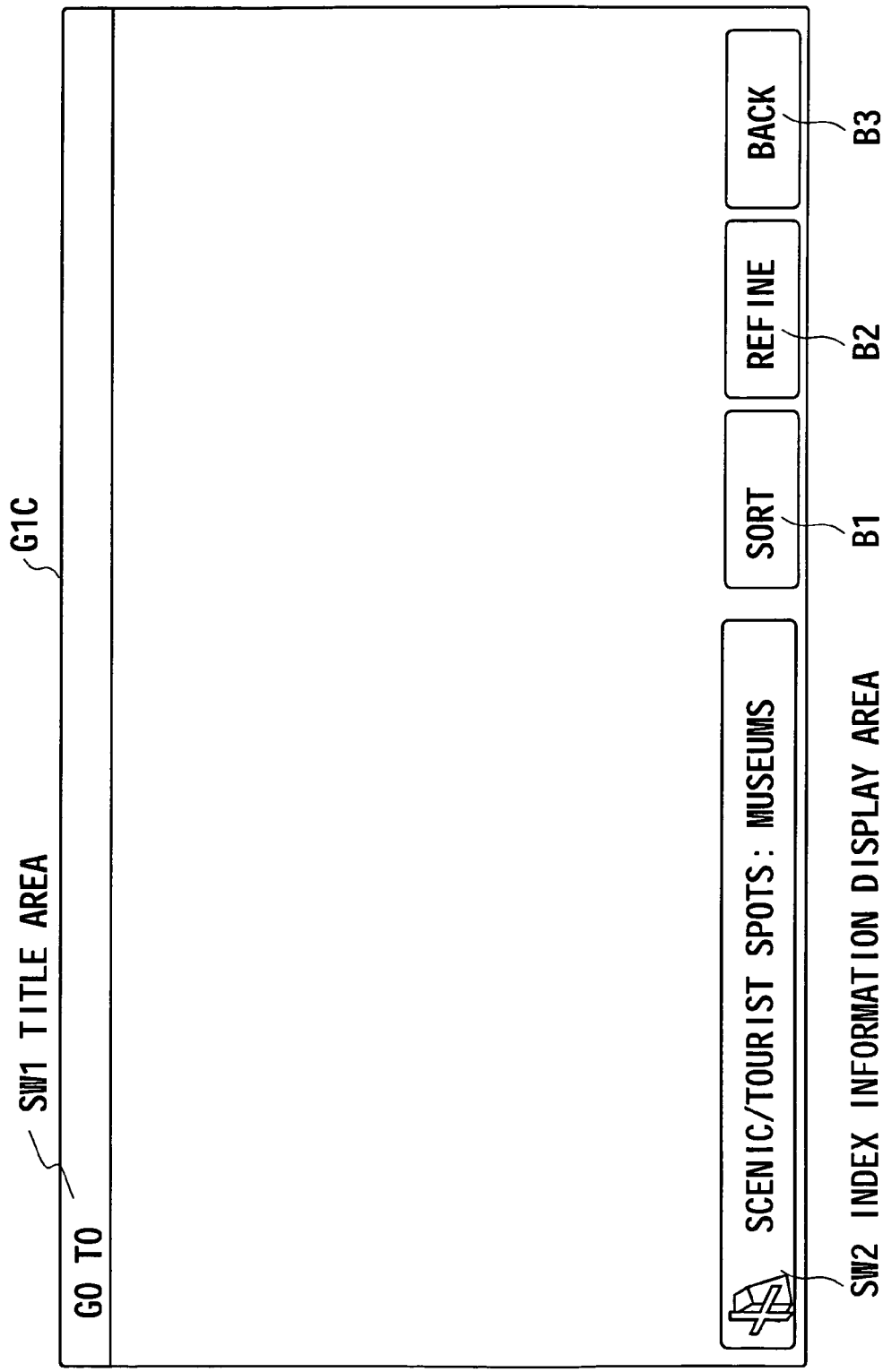
FIG. 12 is a schematic diagram showing a title image in which a title area and an index information display area are arranged.
Figure 13:
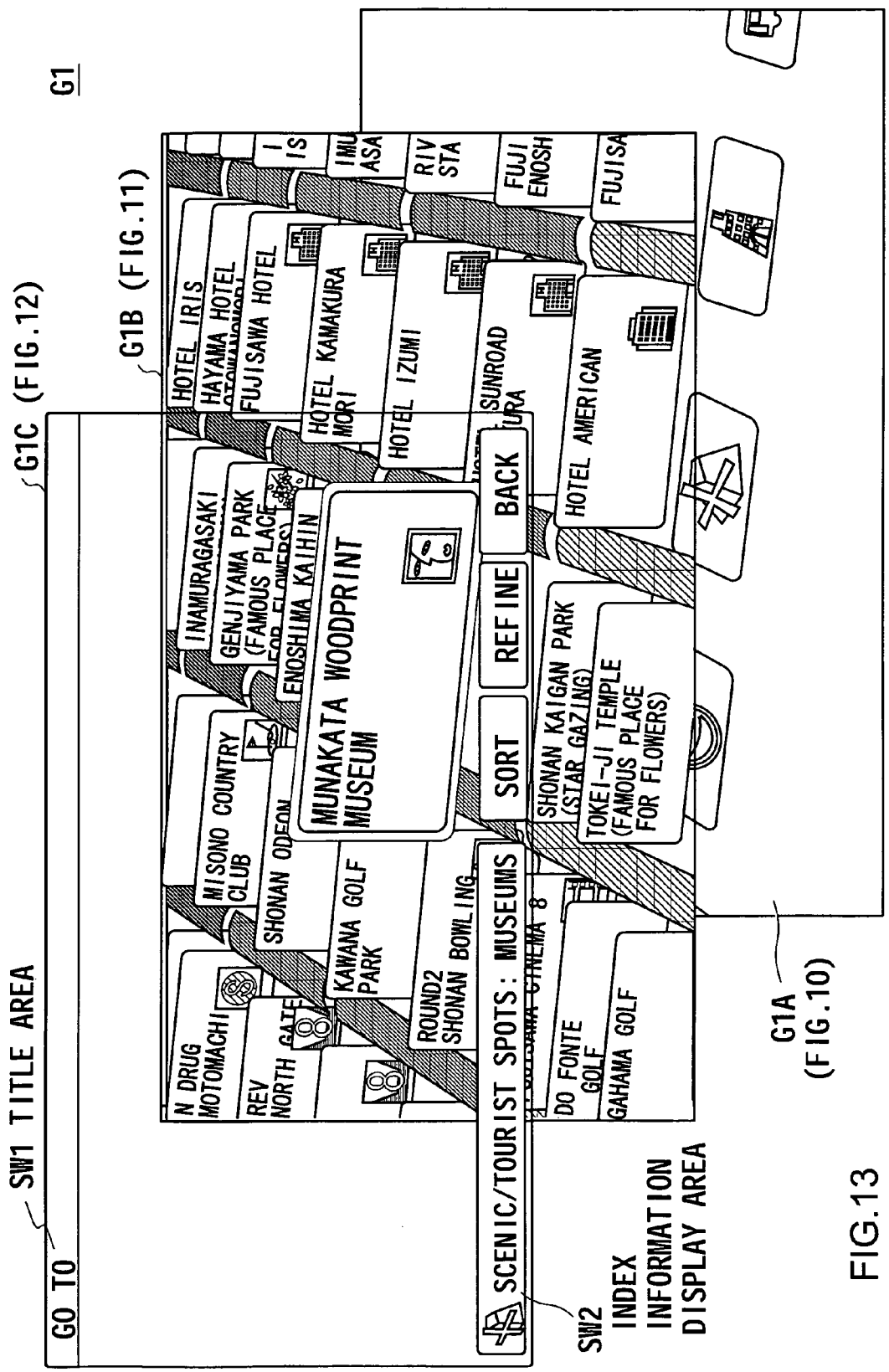
FIG. 13 is a schematic diagram showing the search result screen of three-layer structure.

In fact, the search result screen G1 like this is composed of a stack of three layers as shown in FIG. 13, including a major classification genre icon image G1A, a 3-D POI card display image G1B, and a title image G1C. As shown in FIG. 10, the major classification genre icon image G1A includes only the major classification genre icons BJA of respective major classification genres (in this case, major classification genre icons BJA3, BJA2, BJA6, BJA5, and BJA4) which are arranged along the major classification genre axis (X-axis). As shown in FIG. 11, the 3-D POI card display image G1B includes a plurality of POI cards CD which are arranged along the basic frame consisting of the major classification genre axis (X-axis) and the POI card display axis (Y-axis). As shown in FIG. 12, the title image G1C includes the title area SW1 and the index information display area SW2.

When an up or down arrow button or a right or left arrow button on the remote control RC is depressed by the user, the CPU 2 of the PND 1 moves the 3-D POI card display image G1B alone over the major classification genre icon image G1A for display, thereby shifting the range of display to appear on the search result screen G1. The CPU 2 of the PND 1 keeps the major classification genre icon image G1A and the title image G1C fixed in the meantime.

Since the CPU 2 of the PND 1 keeps the major classification genre icon image G1A fixed even when moving the 3-D POI card display image G1B, the user can constantly visually identify the major classification genre icon BJA6 that lies in the position corresponding to the POI card CD currently in focus. This can prevent the user from losing sight of the major classification genre icon BJA6.

Figure 14:
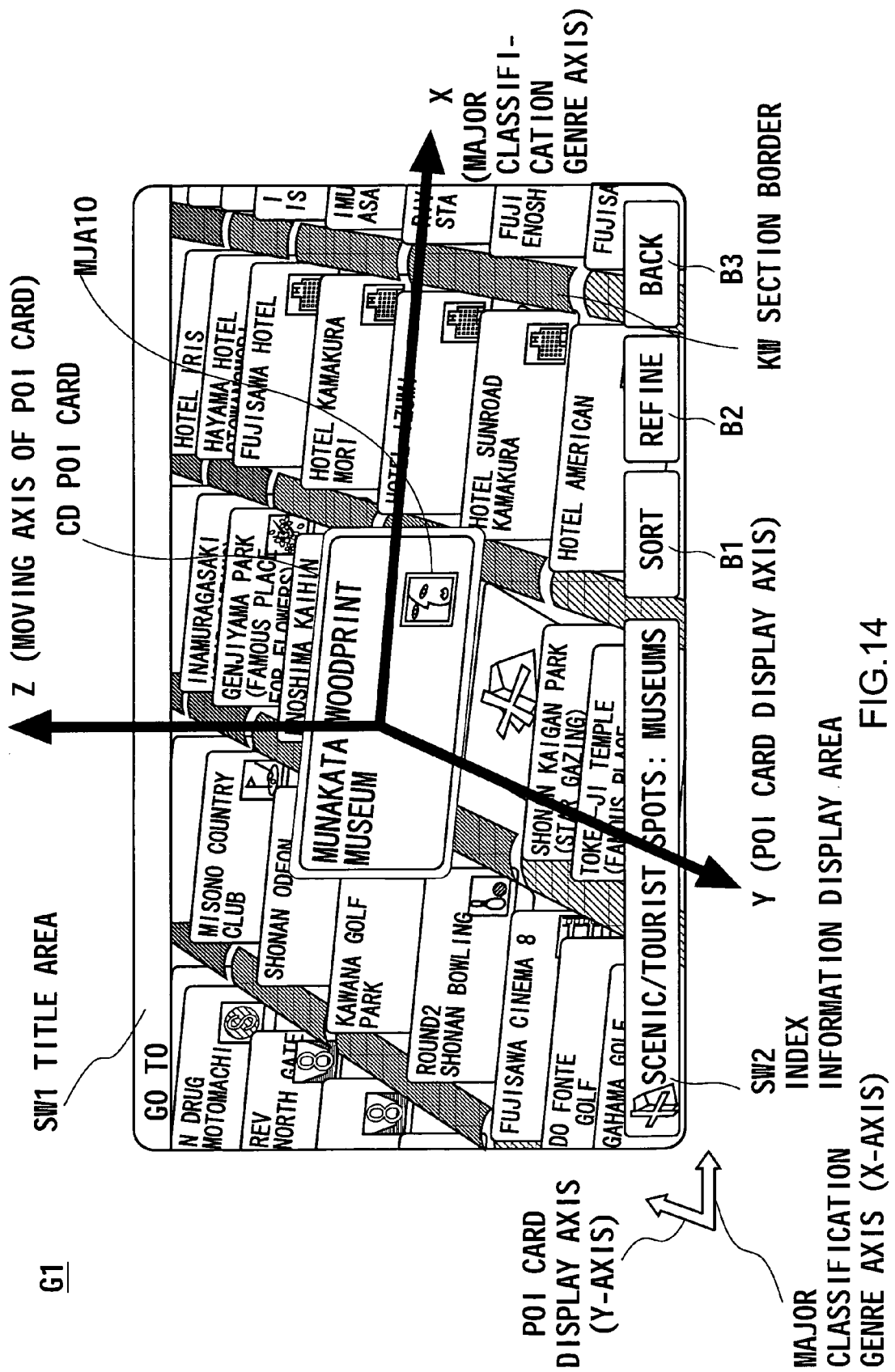
FIG. 14 is a schematic diagram for explaining the display angle of the search result screen.

As shown in FIG. 14, the CPU 2 of the PND 1 is capable of changing the display angle of the search result screen G1 arbitrarily. For that purpose, a moving axis for moving the POI cards CD vertically upward is provided as the Z-axis aside from the major classification genre axis (X-axis) and the POI card display axis (Y-axis).

Figure 15:
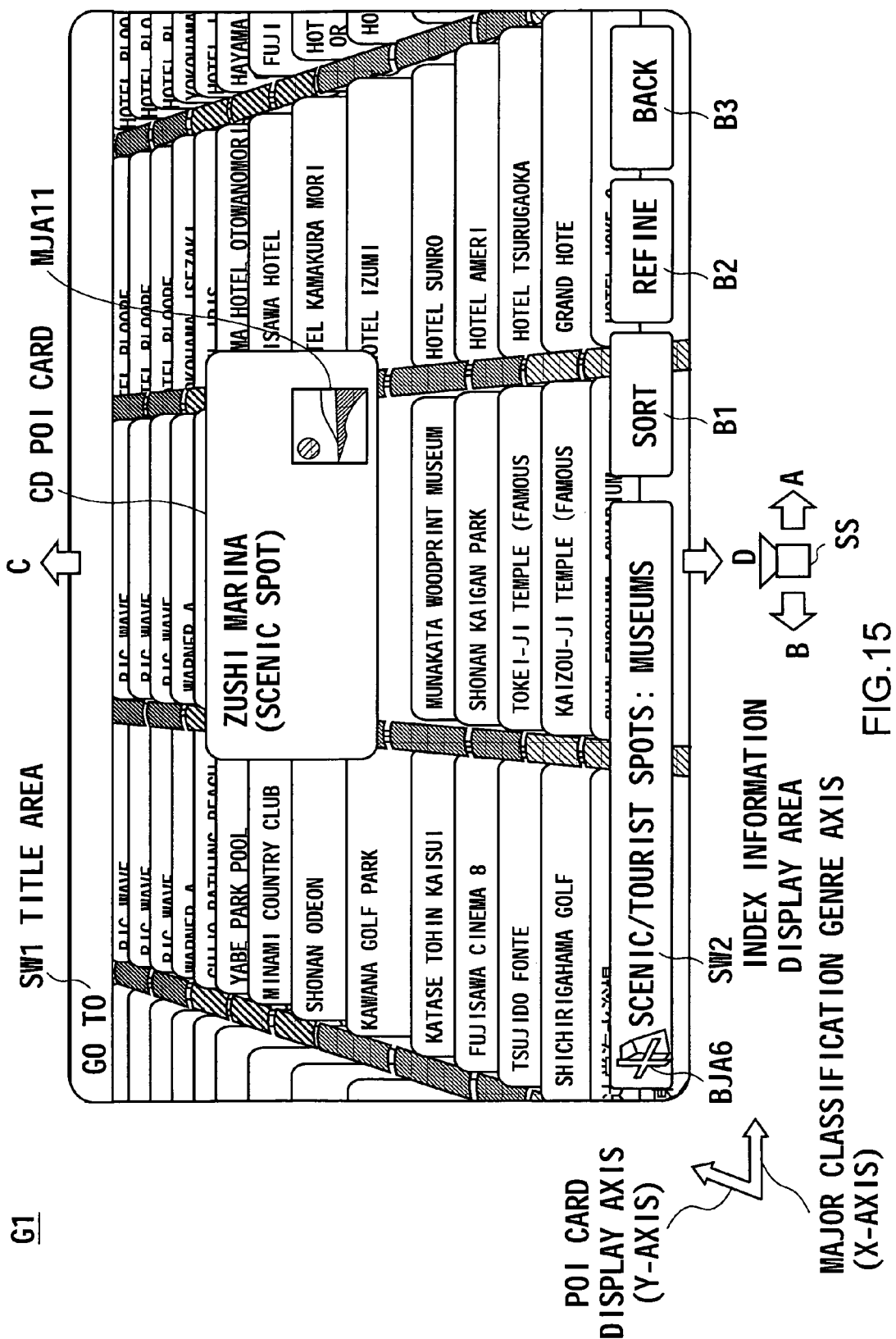
FIG. 15 is a schematic diagram for explaining a change of the display angle with respect to the search result screen.

As shown in FIG. 15, when the user makes a rightward drag operation from the remote control RC, the CPU 2 of the PND 1 shifts and displays the entire 3-D POI card display image G1B of the search result screen G1 as if the point of view SS is moved in the direction of the arrow A along the X-axis.

Consequently, the CPU 2 of the PND 1 can present the search result screen G1 on the LCD 9 with such a display angle as shown in FIG. 4.

When the user makes a leftward drag operation from the remote control RC, the CPU 2 of the PND 1 shifts and displays the entire 3-D POI card display image G1B of the search result screen G1 as if the point of view SS is moved in the direction of the arrow B along the X-axis.

Consequently, the CPU 2 of the PND 1 can present a search result screen G1 (not shown) on the LCD 9 with a display angle reverse to shown in FIG. 4.

Now, when the user makes an upward drag operation from the remote control RC, the CPU 2 of the PND 1 shifts and displays the entire 3-D POI card display image G1B of the search result screen G1 as if the point of view SS is moved in the direction of the arrow C along the Y-axis.

Similarly, when the user makes a downward drag operation from the remote control RC, the CPU 2 of the PND 1 shifts and displays the entire 3-D POI card display image G1B of the search result screen G1 as if the point of view SS is moved in the direction of the arrow D along the Y-axis.

Consequently, the CPU 2 of the PND 1 can present on the LCD 9 a search result screen G1 (not shown) that results when the way of overlapping between the plurality of POI cards CD arranged along the POI card display axis (Y-axis) is adjusted according to the display angle.

More specifically, in response to an upward drag operation from the remote control RC, the CPU 2 of the PND 1 shifts and displays the entire 3-D POI card display image G1B of the search result screen G1 as if the point of view SS is moved in the direction of the arrow C along the Y-axis. In this case, the plurality of POI cards CD show to the user with smaller overlaps, but with less readability of the POI titles and the like.

In response to a downward drag operation from the remote control RC, on the other hand, the CPU 2 of the PND 1 shifts and displays the entire 3-D POI card display image G1B of the search result screen G1 as if the point of view SS is moved in the direction of the arrow D along the Y-axis. In this case, the plurality of POI cards CD show to the user with greater overlaps, which increase the amount of information that can be displayed at a time, though making the POI titles and the like of farther POI cards CD less readable.

That is, the CPU 2 of the PND 1 can present the search result screen G1 on the LCD 9 with various display angles resulting from the movement of the point of view SS according to a horizontal drag operation and vertical drag operation from the remote control RC. This makes it possible to provide the search result screen G1 that is most easily viewable to each individual user.

It should be appreciated that the CPU 2 of the PND 1 may shift and display the entire 3-D POI card display image G1B of the search result screen G1 as if the point of view SS is moved in the direction of the arrow D along the Y-axis in response to an upward drag operation from the remote control RC. The shifting directions may be changed arbitrarily depending on user preferences and the discretion of design.

Similarly, the CPU 2 of the PND 1 may shift and display the entire 3-D POI card display image G1B of the search result screen G1 as if the point of view SS is moved in the direction of the arrow C along the Y-axis in response to a downward drag operation from the remote control RC. The shifting directions may be changed arbitrarily depending on user preferences and the discretion of design.

Figure 16:
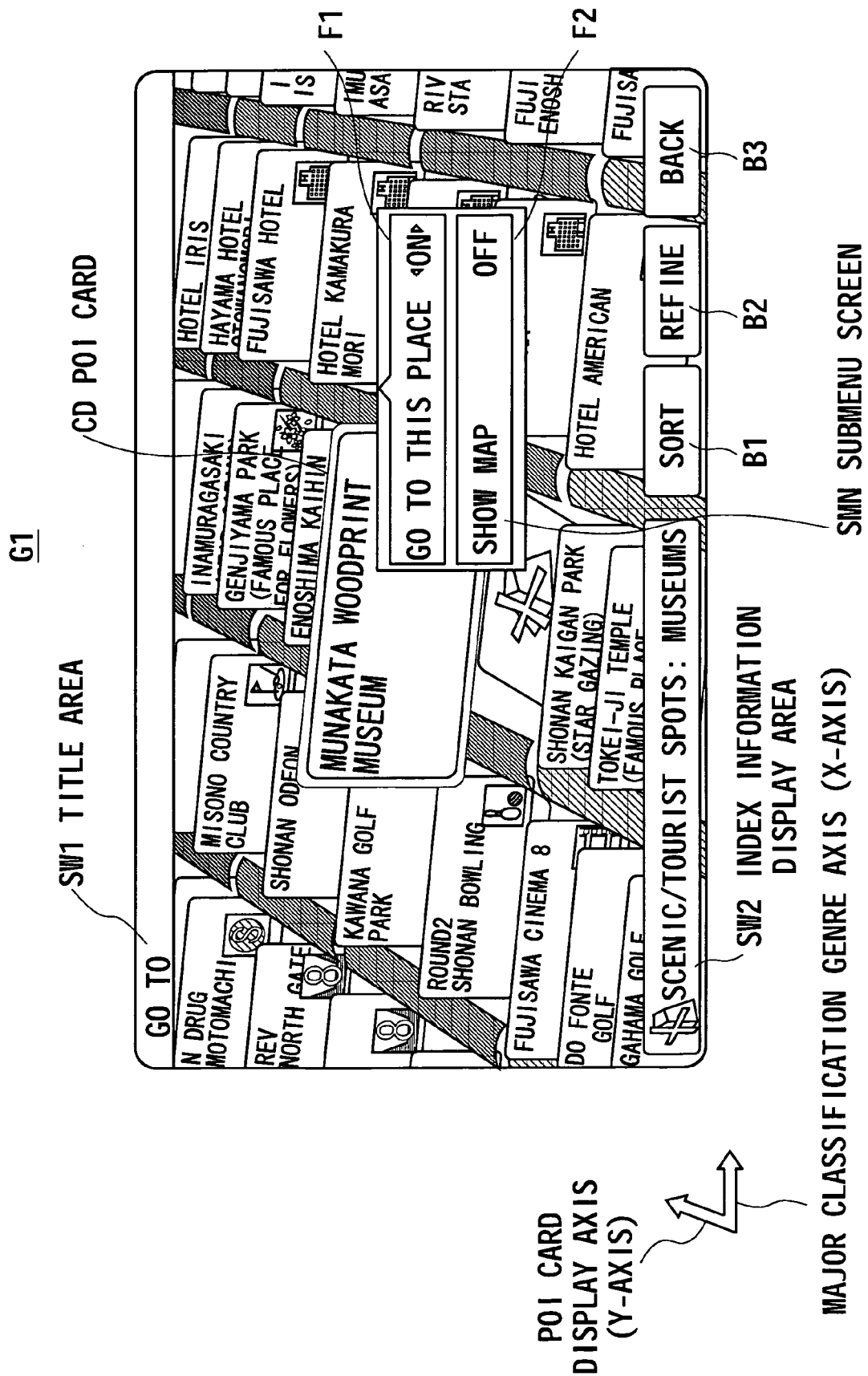
FIG. 16 is a schematic diagram for explaining a destination setting operation using the search result screen.

Finally, as shown in FIG. 16, when a depressing operation on a destination button (not shown) of the remote control RC is recognized, for example, in a state where the POI card CD having a POI title of "Munakata Woodprint Museum" is currently in focus, then the search result screen G1 displays a submenu screen SMN so as to overlap with the POI card CD.

The submenu screen SMN has a "Go to this place" button F1 and a "Show map" button F2. If the "Go to this place" button F1 is depressed and the "ON" state is selected, the CPU 2 of the PND 1 then sets the POI card CD as the destination.

In this case, the CPU 2 of the PND 1 searches for a route from the current position to the destination, and displays the searched route on the LCD 9.

If the "Show map" button F2 is depressed and the "ON" state is selected, the CPU 2 of the PND 1 reads a map image of predetermined magnification around the POI point corresponding to the POI card CD currently in focus from the hard disk drive 5, and displays the same on the LCD 9. The CPU 2 of the PND 1 thereby lets the user visually observe the destination and its surroundings.

(4) Procedure of Search Result Screen Creation Processing

Figure 17:
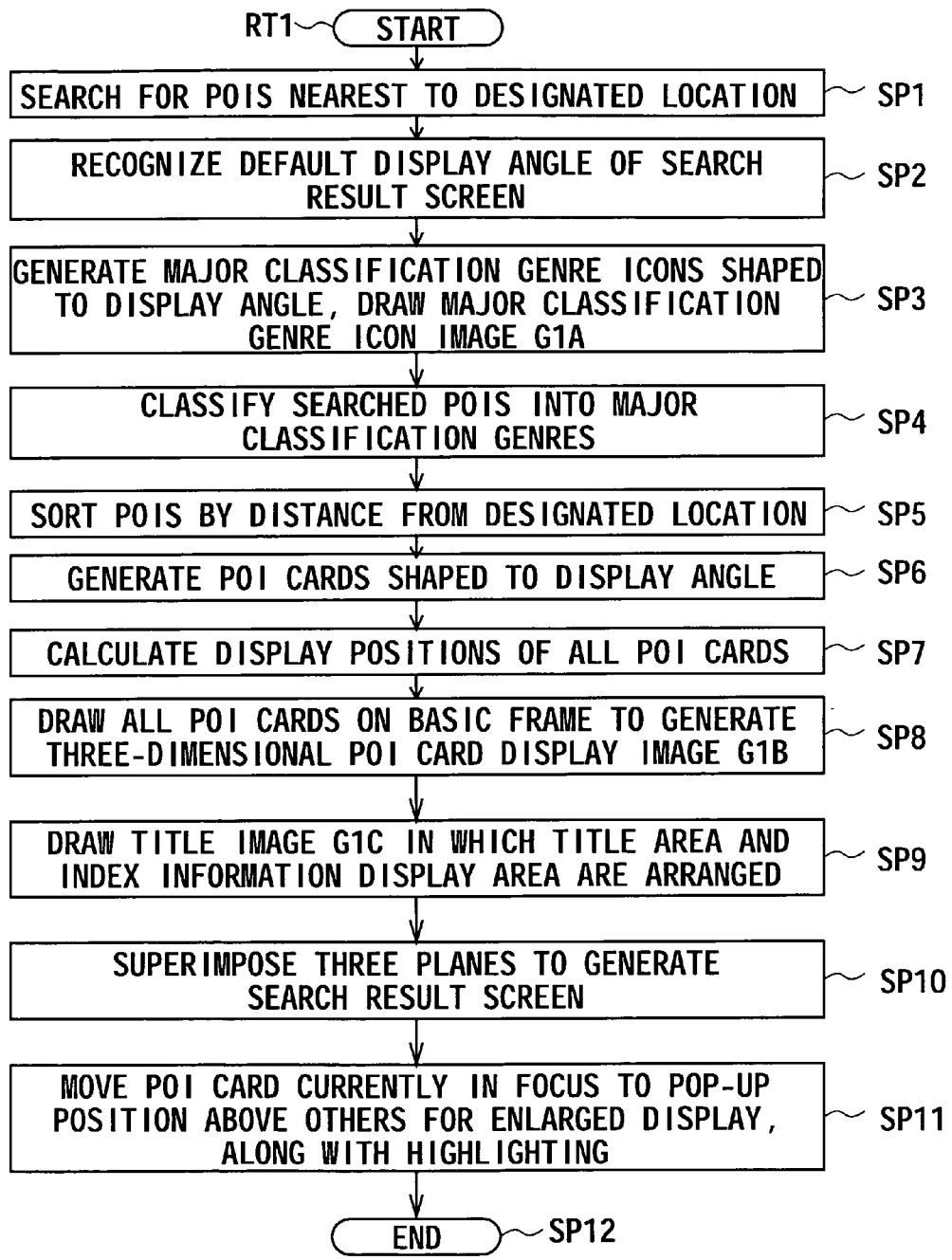
FIG. 17 is a flowchart showing the procedure of search result screen creation processing.

Next, referring to the flowchart of FIG. 17, description will be given of the procedure of search result screen creation processing by which the CPU 2 of the PND 1 creates the foregoing search result screen G1 according to a search result screen creation program which is an application program.

In fact, the CPU 2 of the PND 1 enters a routine RT1 from the start step and proceeds to the next step SP1. At step SP1, the CPU 2 of the PND 1 searches for POIs nearest to a designated location (for example, the current position) under the destination search instruction S3 which is transmitted in response to a depressing operation on the "destination" button of the remote control RC. The CPU 2 of the PND 1 then proceeds to the next step SP2.

At step SP2, the CPU 2 of the PND 1 recognizes the default display angle of the search result screen G1, and then proceeds to the next step SP3.

At step SP3, the CPU 2 of the PND 1 generates the major classification genre icons BJA1 to BJA9 which are shaped to the display angle of the search result screen G1. The CPU 2 of the PND 1 makes the GPU 3 draw the major classification genre icon image G1A (FIG. 10) in which the major classification genre icons BJA1 to BJA9 are arranged, and proceeds to the next step SP4.

At step SP4, the CPU 2 of the PND 1 classifies the POIs searched at step SP1 in accordance with the major classification genres, and proceeds to the next step SP5. At step SP5, the CPU 2 of the PND 1 sorts the POIs classified by the major classification genres, in order of closeness to the designated location (current position). The CPU 2 of the PND 1 then proceeds to the next step SP6.

At step SP6, the CPU 2 of the PND 1 generates POI cards CD which are shaped to the display angle of the search result screen G1, and proceeds to the next step SP7. At step SP7, the CPU 2 of the PND 1 calculates the display positions of all the POI cards CD generated at step SP6, with respect to the basic frame (the major classification genre axis (X-axis)×the POI card display axis (Y-axis)). The CPU 2 of the PND 1 then proceeds to the next step SP8.

At step SP8, the CPU 2 of the PND 1 makes the GPU 3 draw all the POI cards CD with respect to the basic frame according to the display positions calculated at step SP7, thereby generating the 3-D POI card display image G1B (FIG. 11). The CPU 2 of the PND 1 then proceeds to the step SP9.

At step SP9, the CPU 2 of the PND 1 makes the GPU 3 draw the title image G1C (FIG. 12) in which the title area SW1 and the index information display area SW2 of the search result screen G1 are arranged. The CPU 2 of the PND 1 then proceeds to the next step SP10.

At step SP10, the CPU 2 of the PND 1 superimposes the major classification genre icon image G1A generated at step SP3, the 3-D POI card display image G1B generated at step SP8, and the title image G1C generated at step SP9, thereby generating the search result screen G1 (FIG. 13). The CPU 2 of the PND 1 then proceeds to the next step SP11.

At step SP11, the CPU 2 of the PND 1 moves the POI card CD currently in focus on the search result screen G1 to a pop-up position above the others for enlarged display, and adjusts the brightness level of the POI card CD to increase and decrease for highlighting. The CPU 2 of the PND 1 thereby presents which of the POI cards CD is currently selected, so as to be identifiable at a glance. The CPU 2 of the PND 1 then proceeds to the next step SP12 to end the processing.

(5) Procedures of Animation Processing

Next, the procedures of animation processing will be described separately for the case of moving the foregoing display angle of the search result screen G1 when changing the point of view in the X-axis direction and for the case of moving the display angle of the search result screen G1 when changing the point of view in the Y-axis direction according to an animation processing program which is an application program.

Figure 18:
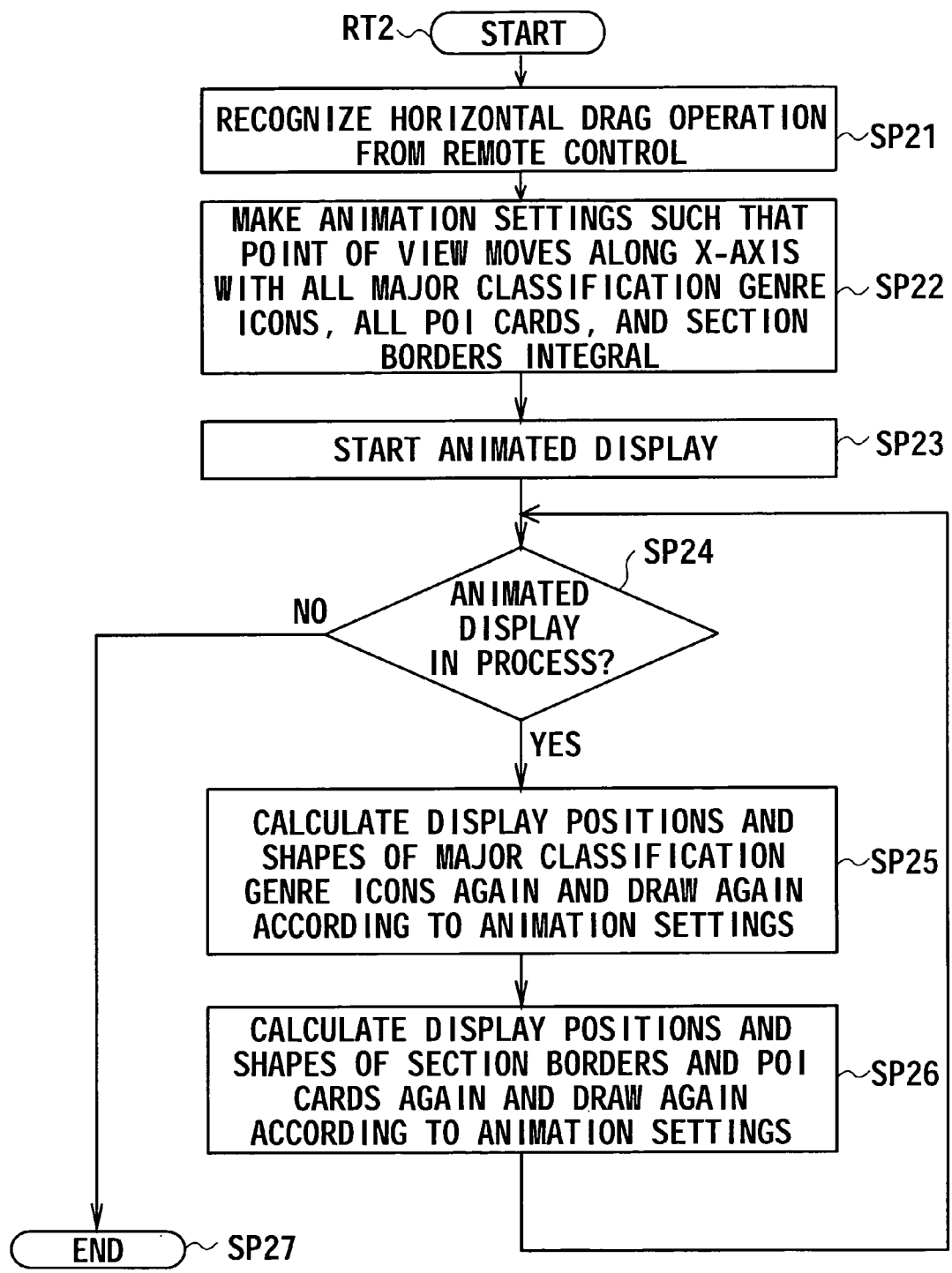
FIG. 18 is a flowchart showing the procedure of animation processing when moving the point of view in the X-axis direction.

(5-1) Procedure of Animation Processing When Changing Point of View in X-Axis Direction As shown in FIG. 18, the CPU 2 of the PND 1 enters a routine RT2 from the start step and proceeds to the next step SP21. With the search result screen G1 displayed on the LCD 9, the CPU 2 of the PND 1 recognizes a horizontal drag operation from the remote control RC, and proceeds to the next step SP22.

At step SP 22, the CPU 2 of the PND 1 makes animation settings for presenting a search result screen G1 on the LCD 9 at a display angle such that the point of view SS is moved along the X-axis with all the major classification genre icons BJA1 to BJA9 of the major classification genre icon image G1A and all the POI cards and section borders KW of the 3-D POI card display image G1B integral. The CPU 2 of the PND 1 then proceeds to the next step SP23.

At step SP23, the CPU 2 of the PND 1 starts animated display of changing the search result screen G1 to the display angle gradually as if the point of view SS moves along the X-axis, according to the animation settings made at step SP22. The CPU 2 of the PND 1 then proceeds to the next step SP24.

At step SP24, the CPU 2 of the PND 1 determines whether or not the animated display started at step SP 23 is still in process. If the result is positive, the CPU 2 of the PND 1 proceeds to the next step SP25.

At step SP25, the CPU 2 of the PND 1 calculates the display positions and shapes of all the major classification genre icons BJA1 to BJA9 again and draws the major classification genre icon image G1A again according to the animation settings for changing the display angle of the search result screen G1. The CPU 2 of the PND 1 then proceeds to the next step SP26.

At step SP26, the CPU 2 of the PND 1 calculates the display positions and shapes of the section borders KW and all the POI cards CD again and draws the 3-D POI card display image G1B again according to the animation settings. The CPU 2 of the PND 1 then returns to the step SP24.

In this way, the CPU 2 of the PND 1 redraws the major classification genre icon image G1A and the 3-D POI card display image G1B which constitute the search result screen G1, according to the animation settings for changing the display angle of the search result screen G1. The CPU 2 of the PND 1 can thus provide the animated display of changing the search result screen G1 to the display angle such that the point of view SS moves along the X-axis.

At step SP24, the CPU 2 of the PND 1 repeats the processing of this step SP24 to step SP26 until the animated display according to the animation settings is completed. If the animated display is completed, which results in a negative determination, then the CPU 2 of the PND 1 proceeds to the next step SP27 to end the processing.

Figure 19:
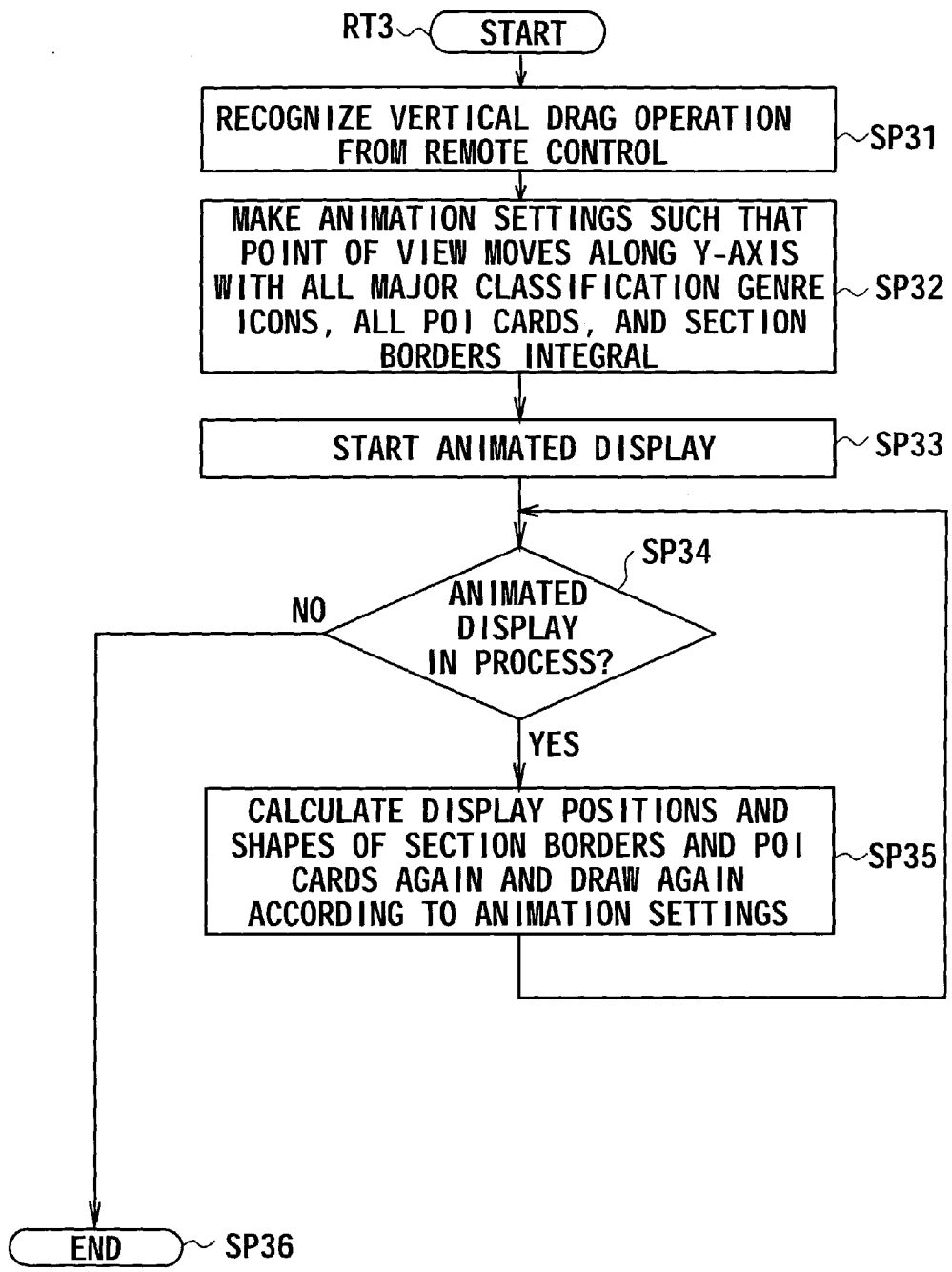
FIG. 19 is a flowchart showing the procedure of animation processing when moving the point of view in the Y-axis direction.

(5-2) Procedure of Animation Processing When Changing Point of View in Y-Axis Direction As shown in FIG. 19, the CPU 2 of the PND 1 enters a routine RT3 from the start step and proceeds to the next step SP31. With the search result screen G1 displayed on the LCD 9, the CPU 2 of the PND 1 recognizes a vertical drag operation from the remote control RC, and proceeds to the next step SP32.

At step SP32, the CPU 2 of the PND 1 makes animation settings for presenting a search result screen G1 on the LCD 9 at a display angle such that the point of view SS is moved along the Y-axis with all the major classification genre icons BJA1 to BJA9 of the major classification genre icon image G1A and all the POI cards CD and section borders KW of the 3-D POI card display image G1B integral. The CPU 2 of the PND 1 then proceeds to the next step SP33.

At step SP33, the CPU 2 of the PND 1 starts animated display of changing the search result screen G1 to the display angle gradually as if the point of view SS moves along the Y-axis, according to the animation settings made at step SP32. The CPU 2 of the PND 1 then proceeds to the next step SP34.

At step SP34, the CPU 2 of the PND 1 determines whether or not the animated display started at step SP 33 is still in process. If the result is positive, the CPU 2 of the PND 1 proceeds to the next step SP35.

At step SP35, the CPU 2 of the PND 1 calculates the display positions and shapes of the section borders KW and all the POI cards CD again and draws the 3-D POI card display image G1B again according to the animation settings. The CPU 2 of the PND 1 then returns to the step SP34 once again.

In this way, the CPU 2 of the PND 1 redraws the 3-D POI card display image G1B which constitutes the search result screen G1, according to the animation settings for changing the display angle of the search result screen G1. The CPU 2 of the PND 1 can thus provide the animated display of changing the search result screen G1 to the display angle such that the point of view SS moves along the Y-axis.

Since the animation settings here are intended to change the search result screen G1 to the display angle such that the point of view SS moves along the Y-axis, the CPU 2 of the PND 1 need not recalculate the display positions and shapes of the major classification genre icons BJA1 to BJA9 which are arranged in a two-dimensional fashion with respect to the major classification genre icon image G1A in the first place. In other words, the CPU 2 of the PND 1 need not redraw the major classification genre icon image G1A.

Consequently, the CPU 2 of the PND 1 redraws only the 3-D POI card display image G1B which constitutes the search result screen G1, according to the animation settings for changing the display angle of the search result screen G1. The CPU 2 of the PND 1 can thus provide the animated display of changing the search result screen G1 to the display angle such that the point of view SS moves along the Y-axis.

At step SP34, the CPU 2 of the PND 1 repeats the processing of this step SP34 and step SP35 until the animated display according to the animation settings is completed. If the animated display is completed, which results in a negative determination, then the CPU 2 of the PND 1 proceeds to the next step SP36 to end the processing.

(6) Procedures of Animation Processing When Selecting POI Card

Figure 20:
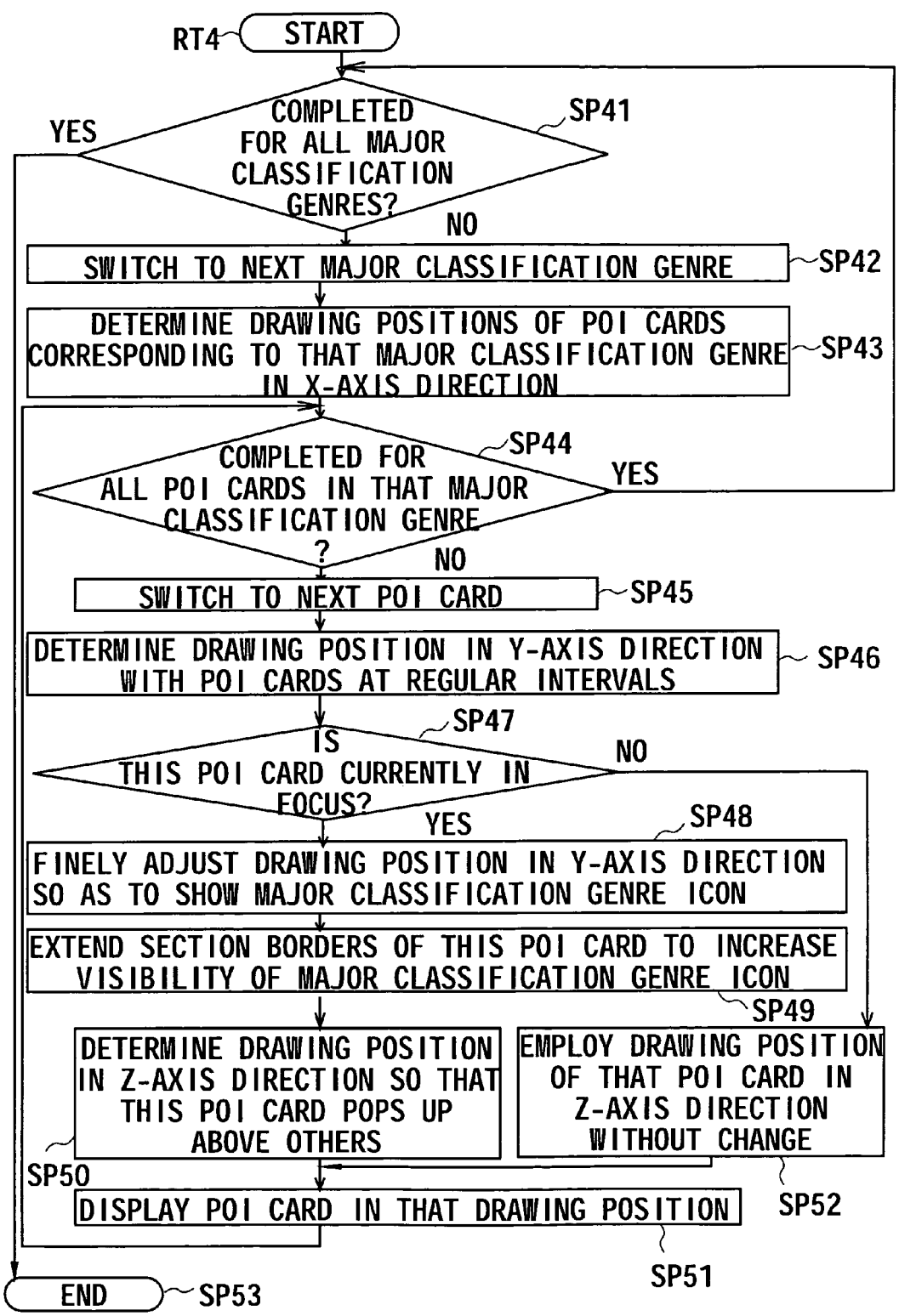
FIG. 20 is a flowchart showing the procedure of animation processing when selecting a POI card.

Finally, referring to the flowchart of FIG. 20, description will be given of a series of procedures animation processing by which the POI card CD in focus on the foregoing search result screen G1 is moved to a pop-up position above the others for enlarged display, and the brightness level of the POI card CD is adjusted to increase and decrease for highlighting, according to the animation processing program which is an application program.

The CPU 2 of the PND 1 enters a routine RT4 from the start step and proceeds to the next step SP41. The CPU 2 of the PND 1 initially determines whether or not checking of the animation processing is completed for all the major classification genres. If the result is negative, the CPU 2 of the PND 1 proceeds to the next step SP42.

At step SP42, the CPU 2 of the PND 1 switches to the next major classification genre because the checking of the animation processing is not yet completed for all the major classification genres. The CPU 2 of the PND 1 then proceeds to the next step SP43.

At step SP43, the CPU 2 of the PND 1 determines the drawing positions of respective POI cards CD corresponding to the major classification genre in the direction of the major classification genre axis (i.e., the X-axis direction), and proceeds to the next step SP44.

At step SP44, the CPU 2 of the PND 1 determines whether or not the checking of the animation processing is completed for all the POI cards CD in the major classification genre. If the result is negative, the CPU 2 of the PND 1 proceeds to the next step SP45.

At step SP45, the CPU 2 of the PND 1 switches to the next POI card CD since the checking of the animation processing is not yet completed for all the POI cards CD in the major classification genre. The CPU 2 of the PND 1 then proceeds to the next step SP46.

At step SP46, the CPU 2 of the PND 1 determines the drawing position of the POI card CD of the major classification genre in the direction of the POI card display axis (i.e., the Y-axis direction), and proceeds to the next step SP47.

At step SP47, the CPU 2 of the PND 1 determines whether or not this POI card CD in an arbitrary position is currently in focus, out of a plurality of POI cards CD corresponding to the drawing positions in the direction of the major classification genre axis (X-axis direction), determined at step SP43, and the drawing position in the direction of the POI card display axis (Y-axis direction), determined at step SP46.

Here, the CPU 2 of the PND 1 determines this POI card CD to be currently in focus if its drawing position corresponds to the focus position near the center. If not, the CPU 2 of the PND 1 determines this POI card CD not to be currently in focus.

If the result is positive, which indicates that this POI card CD is in focus, i.e., to be subjected to the animation processing, then the CPU 2 of the PND 1 proceeds to the next step SP48.

At step SP48, the CPU 2 of the PND 1 finely adjusts the drawing position of the POI card CD in the direction of the POI card display axis (Y-axis direction) toward the far side or near side so that the user can visually observe the major classification genre icon, e.g., BJA6 (FIG. 4) that lies under the POI card CD in focus. The CPU 2 of the PND 1 then proceeds to the next step SP49.

At step SP49, the CPU 2 of the PND 1 makes the section borders KW corresponding to this POI card CD longer than the others, thereby further improving the visibility of the major classification genre icon BJA6 that shows under the POI card CD. The CPU 2 of the PND 1 then proceeds to the next step SP50.

At step SP50, the CPU 2 of the PND 1 determines the drawing position of this POI card CD in the Z-axis direction in order to display the POI card CD as if it vertically pops up above the others. The CPU 2 of the PND 1 then proceeds to the next step SP51.

At step SP51, the CPU 2 of the PND 1 moves the POI card CD to the drawing position in the Z-axis direction, determined at step SP51, and magnifies it by a predetermined magnification for display. The CPU 2 of the PND 1 then returns to step SP44.

Here, the CPU 2 of the PND 1 performs the animation processing of moving this POI card CD to the drawing position in the Z-axis direction so that the POI card CD pops up above the others for enlarged display, and adjusting the brightness level of the POI card CD to increase and decrease alternately for highlighting. The CPU 2 of the PND 1 can thus make the user intuitively recognize that this POI card CD is currently selected.

On the other hand, if the result at step SP47 is negative, which indicates that this POI card CD is not currently in focus, i.e., not to be subjected to the animation processing, then the CPU 2 of the PND 1 proceeds to the next step SP52.

At step SP52, the CPU 2 of the PND 1 simply employs the current drawing position in the Z-axis direction without a change since this POI card CD is not currently in focus and it is not necessary to move this POI card CD to a pop-up position above the others for enlarged display. The CPU 2 of the PND 1 returns to step SP51 to display the POI card CD in the same drawing position, and returns to step SP44.

At step SP44, the CPU 2 of the PND 1 determines again whether or not the checking of the animation processing is completed for all the POI cards CD in the major classification genre. If the result is positive, the CPU 2 of the PND 1 returns to step SP41.

At step SP41, the CPU 2 of the PND 1 determines whether or not the checking of the animation processing on the POI cards CD at step SP44 and subsequent steps is completed for all the major classification genres. If the result is negative, the CPU 2 of the PND 1 repeats the processing of the next step SP42 and subsequent steps. If the result is positive, the CPU 2 of the PND 1 proceeds to step SP53 to end the processing.

(7) Operation and Effect

With the foregoing configuration, the CPU 2 of the PND 1 generates a search result screen G1 in which the result of a POI search, i.e., a plurality of POI cards CD having POI titles show as if they are stereoscopically arranged in a domino-like configuration with predetermined intervals along the basic frame which is two-dimensionally configured based on the major classification genre axis (X-axis) and the POI card display axis (Y-axis). The CPU 2 of the PND 1 displays this search result screen G1 on the LCD 9 at a predetermined display angle.

Figure 1:
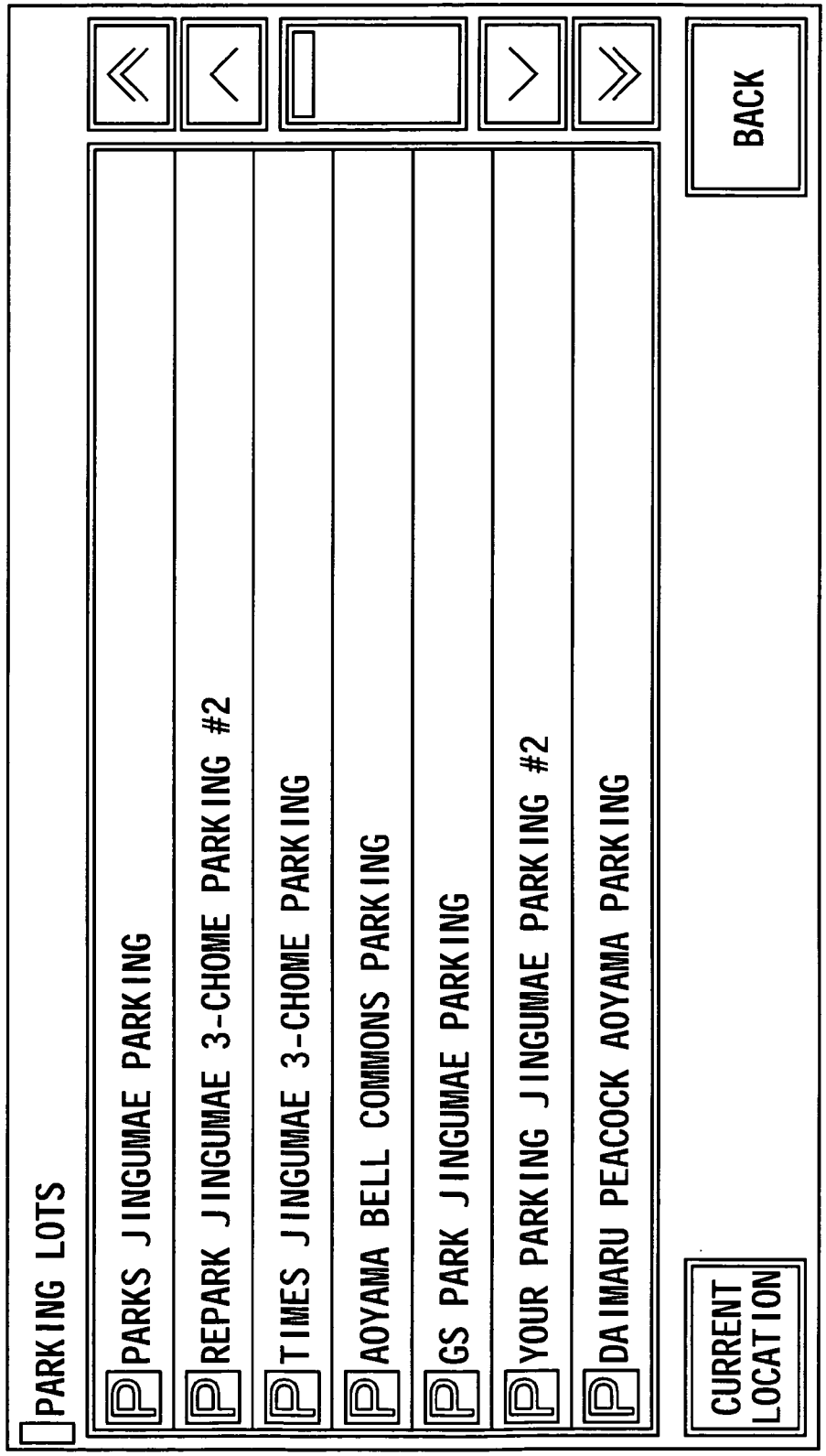
FIG. 1 is a schematic diagram showing the configuration of a conventional search result screen.

Since the PND 1 can thus present a large number of POI cards CD on this search result screen G1 at the same time as if the plurality of POI cards CD are stereoscopically arranged in a domino-like configuration, it is possible to significantly increase the amount of information that can be displayed at a time as compared to the conventional two-dimensional search result screen LG (FIG. 1).

The PND 1 moves the POI card CD currently in focus to a pop-up position above the others and magnifies it by a predetermined magnification for display, along with highlighting. This makes it possible for the user to intuitively recognize which POI card CD is currently selected from among the large number of POI cards present.

The PND 1 moves the POI card CD currently in focus to the pop-up position above the others for enlarged display, thereby improving the visibility of the major classification genre icon BJA6 (FIG. 4) seen under the same. This also makes it possible to recognize the major classification genre of that POI card CD simultaneously and intuitively through the major classification genre icon BJA6.

Note that the PND 1 displays the section borders KW of the POI card CD currently in focus as extended the longest, thereby facilitating recognizing the currently-selected POI card CD from the sizes of the section borders KW. This can also improve the visibility of the major classification genre icon BJA6 further.

The PND 1 creates the search result screen G1 in a three-layer structure, including the major classification genre icon image G1A, the 3-D POI card display image G1B, and the title image G1C superimposed.

Consequently, when providing animated display for moving the point of view SS or animated display pertaining to the POI card CD currently in focus, the PND 1 need not make a modification to the display of the title image G1C which requires no particular movement. This can reduce the processing load on the CPU 2 and the GPU 3.

According to the above configuration, the PND 1 generates a search result screen G1 in which a plurality of POI cards show as if they are stereoscopically arranged in a domino-like configuration with predetermined intervals along the basic frame which is two-dimensionally constituted based on the major classification genre axis (X-axis) and the POI card display axis (Y-axis), and presents this search result screen G1 on the LCD 9 at a predetermined display angle. The PND 1 can thus facilitate intuitive understanding of the user, and display the search result with high operability through this search result screen G1.

(8) Other Embodiments

The foregoing embodiment has dealt with the case where the major classification genre axis (X-axis) is used as the search item axis which constitutes the basic frame. Nevertheless, the present invention is not limited thereto, but may use a middle classification genre axis which is hierarchically one level lower than the major classification genre.

In this case, genre icons JA of minor classification genres are given to the POI cards CD that are obtained as a result of search according to the middle classification genres. A middle classification genre icon image in which the middle classification genre icons MJA1 to MJA17 are arranged is used instead of the major classification genre icon image G1A in which the major classification genre icons BJA1 to BJA9 are arranged as search item marks.

The foregoing embodiment has also dealt with the case where the POI card display axis (Y-axis) is used as the search result display axis. Nevertheless, the present invention is not limited thereto, but may use a name card display axis (Y-axis) on which name cards having user names used in a phone directory are listed in succession.

In this case, the name cards obtained as a result of search may be arranged in order of the Japanese syllabary or in alphabetic order, using a name card search axis (X-axis) that sections name cards based on Japanese Hiragana letters such as a, i, u, e, and o, or alphabet letters such as A, B, and C.

The foregoing embodiment has also dealt with the case where the brightness level of the POI card CD currently in focus is adjusted to increase and decrease for the sake of highlighting. The present invention is not limited thereto, however. The POI card CD may be displayed in a thicker frame of predetermined color different from that of the POI card CD. The POI card CD may be displayed in a frame of predetermined color along with the highlighting of the POI card CD.

The foregoing embodiment has also dealt with the case where the search result screen G1 is presented on the LCD 9 with a display angle that corresponds to the movement of the point of view SS according to a horizontal drag operation or vertical drag operation from the remote control RC. The present invention is not limited thereto, however. Search result screens G1 with display angles of two or more default settings may be provided so that either one can be selected by the user.

The foregoing embodiment has also dealt with the case where the procedure of search result screen creating processing of the routine RT1 is performed according to the search result screen creation program which is an application program installed in advance, and the procedures of animation processing from the routines RT2 to RT4 are performed according to the animation processing program which is an application program installed in advance. The present invention is not limited thereto, however. The foregoing procedure of search result screen creation processing and the procedures of animation processing may be performed according to a search result screen creation program and an animation processing program that are installed from a predetermined recording medium, a search result screen creation program and an animation processing program that are downloaded over the Internet, and/or a search result screen creation program and an animation processing program that are installed through various other routes.

The foregoing embodiment has also dealt with the case where the major classification genre icon image G1A, the 3-D POI card display image G1B, and the title image G1C are superimposed to create the search result screen G1. The present invention is not limited thereto, however. The search result screen G1 may be composed only of the 3-D POI card display image G1B. The major classification genre icon image G1A and the 3-D POI card display image G1B alone may be superimposed to create the search result screen G1. Alternatively, the 3-D POI card display image G1B and the title image G1C alone may be superimposed to create the search result screen G1.

The foregoing embodiment has also dealt with the case where the PND 1 as a navigation apparatus is composed of the CPU 2 and GPU 3 as a basic frame generating unit and a 3-D search result listing image generating unit, and the CPU 2 as a control unit. The present invention is not limited thereto, however. The navigation apparatus may include a basic frame generating unit, a 3-D search result listing image generating unit, and a control unit of various other circuit configurations.

The navigation apparatus, the search result display method, and the graphical user interface according to the embodiment of the present invention may also be applied to various types of electronic apparatuses other than PND, such as a vehicle navigation apparatus, a personal computer implementing navigation facilities, a personal digital assistant (PDA), a game console, and a cellular phone.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a processing unit configured to:
generate a basic frame two-dimensionally configured based on a search item axis and a search result display axis;
generate a three-dimensional (3-D) search result listing image in which a plurality of search result cards are stereoscopically arranged along the search item axis and the search result display axis of the basic frame, the search result cards having titles of search results thereon, and the position of each search result card along the search result display axis being indicative of the distance between a location associated with the search result card and a designated location; and
output the 3-D search result listing image to a display unit at a predetermined display angle, thereby displaying the 3-D search result listing image at the display angle.

2. The information processing apparatus according to claim 1, wherein the processing unit is configured to:
generate a search item mark image in which a plurality of search item marks are two-dimensionally arranged along the search item axis, the plurality of search item marks having patterns representing a respective plurality of search items, and
outputs the 3-D search result listing image to the display unit as superimposed on the search item mark image.

3. The information processing apparatus according to claim 2, wherein
the processing unit is configured to provide a display effect to a selected search result card that is currently in focus out of the plurality of search result cards, the display effect being such that the selected search result card pops up above the other unselected search result cards.

4. The information processing apparatus according to claim 3, wherein
the processing unit is configured to magnify the selected search result card in display size as the display effect in addition to the pop-up.

5. The information processing apparatus according to claim 4, wherein
when the processing unit is configured to recognize that an input operation is performed for switching the selected search result card to any one of the other unselected search result cards, it moves the plurality of search result cards and provides animated display on the display unit that includes such an action as to give the display effect to the next selected search result card switched.

6. The information processing apparatus according to claim 1, wherein the three-dimensional (3-D) search result listing image is an image in which a plurality of search result cards show as if they are stereoscopically arranged in a domino like configuration along the search item axis and the search result display axis of the basic frame.

7. A search result display method comprising:
generating a basic frame by using a basic frame generating unit, the basic frame being two-dimensionally configured based on a search item axis and a search result display axis;
generating a 3-D search result listing image in which a plurality of search result cards show as if they are stereoscopically arranged in a domino-like configuration along the search item axis and the search result display axis of the basic frame by using a listing image generating unit for generating a 3-D search result listing image, the search result cards having titles of search results thereon, and the position of each search result card along the search result display axis being indicative of the distance between a location associated with the search result card and a designated location; and
outputting the 3-D search result listing image to a display unit at a predetermined display angle by using a control unit, thereby displaying the 3-D search result listing image at the display angle.

8. The search result display method according to claim 7, comprising
generating a search item mark image in which a plurality of search item marks are two-dimensionally arranged along the search item axis, the plurality of search item marks having patterns representing respective plurality of search items, wherein
the control unit outputs the 3-D search result listing image to the display unit as superimposed on the search item mark image.

9. The search result display method according to claim 8, wherein
the control unit gives a display effect to a selected search result card that is currently in focus out of the plurality of search result cards, the display effect being such that the selected search result card pops up above the other unselected search result cards.

10. The search result display method according to claim 9, wherein
magnifying by the control unit, the selected search result card in display size as the display effect in addition to the pop-up.

11. The search result display method according to claim 10, wherein
when the control unit recognizes that an input operation is performed for switching the selected search result card to any one of the other unselected search result cards, it moves the plurality of search result cards and provides animated display that includes such an action as to give the display effect to the next selected search result card switched.

12. A non-transitory computer-readable medium having stored thereon a computer-readable program for implementing a search result display method, the method comprising:
generating a basic frame by using a basic frame generating unit, the basic frame being two-dimensionally configured based on a search item axis and a search result display axis;
generating a 3-D search result listing image in which a plurality of search result cards show as if they are stereoscopically arranged in a domino-like configuration along the search item axis and the search result display axis of the basic frame by using a listing image generating unit for generating a 3-D search result listing image, the search result cards having titles of search results thereon, and the position of each search result card along the search result display axis being indicative of the distance between a location associated with the search result card and a designated location; and
outputting the 3-D search result listing image to a display unit at a predetermined display angle by using a control unit, thereby displaying the 3-D search result listing image at the display angle.

\* \* \* \* \*